United States Patent [19]

Hirai et al.

[11] Patent Number: 5,331,446
[45] Date of Patent: Jul. 19, 1994

[54] LIQUID CRYSTAL OPTICAL ELEMENT AND A LASER PROJECTION APPARATUS USING POLYMER DISPERSED LIQUID CRYSTAL

[75] Inventors: Yoshinori Hirai; Hiroshi Kumai; Takehiko Nishiyama; Satoshi Niiyama; Tsuneo Wakabayashi, all of Yokohama, Japan

[73] Assignee: AG Technology Co., Ltd., Yokohama, Japan

[21] Appl. No.: 74,407

[22] Filed: Jun. 10, 1993

[30] Foreign Application Priority Data

Jun. 10, 1992 [JP] Japan ................. 4-176184
Jun. 10, 1992 [JP] Japan ................. 4-176185

[51] Int. Cl.$^5$ .................. G02F 1/13; G02F 1/37
[52] U.S. Cl. .................. 359/51; 359/93; 359/102
[58] Field of Search ............ 359/51, 52, 102, 93

[56] References Cited

U.S. PATENT DOCUMENTS

| | | | |
|---|---|---|---|
| 4,435,047 | 3/1984 | Fergason | 359/51 |
| 4,613,207 | 9/1986 | Fergason | 359/51 |
| 4,818,070 | 4/1989 | Gunjima et al. | 359/51 |
| 4,834,509 | 5/1989 | Gunjima et al. | 359/51 |
| 5,103,327 | 4/1992 | Hirai et al. | 359/51 |
| 5,150,232 | 9/1992 | Gunkima et al. | 359/51 |
| 5,196,952 | 3/1993 | Hirai et al. | 359/51 |
| 5,216,531 | 6/1993 | Hirai et al. | 359/52 |
| 5,235,445 | 8/1993 | Hirai et al. | 359/52 |
| 5,245,449 | 9/1993 | Ooi et al. | 359/51 |

FOREIGN PATENT DOCUMENTS

| | | |
|---|---|---|
| 64-11088 | 1/1989 | Japan . |
| 2-6095 | 1/1990 | Japan . |
| 2-165880 | 6/1990 | Japan . |
| 2-241681 | 9/1990 | Japan . |
| 3-180285 | 8/1991 | Japan . |
| 3-193281 | 8/1991 | Japan . |
| 3-264178 | 11/1991 | Japan . |
| 4-251683 | 9/1992 | Japan . |
| 5-34927 | 2/1993 | Japan . |

Primary Examiner—Anita P. Gross
Attorney, Agent, or Firm—Oblon, Spivak, McClelland, Maier & Neustadt

[57] ABSTRACT

A laser projection apparatus including a liquid crystal optical element of a transparent and scattering type having a liquid crystal and solidified matrix composite. A laser beam having a wavelength of approximately 1 $\mu m$ emitted from a laser beam source is supplied to the liquid crystal optical element, and a projection optical system operates for reduction-projection a laser beam emitted from the liquid crystal optical element onto an object. Further, with respect to a certain pixel of the liquid crystal optical element, there are overlapped portions between lead lines of a common electrode and lead lines of a segment electrode in the vicinity of the pixel, a width $W_1(\mu m)$ of the overlapped portion, a reduction projection ratio (projection by 1/N) and a gap $d(\mu m)$ between electrodes of the liquid crystal optical element satisfy the relation, $W_1 + d < 10 \times N$. Further, the refractive index anisotropy $\Delta n$ of the employed liquid crystal is 0.18 or higher, the viscosity $\eta(cSt)$ thereof is equal to or less than 60, the refractive index anistropy $\Delta n$, a means particle diameter $R(\mu m)$ of liquid crystal which is dispersed and held in a solidified matrix and the gap $d(\mu m)$ between electrodes satisfy the following relationships, (1) $0.5 < \Delta n \cdot R < 1.3$, and (2) $3.5 < \Delta n \cdot d < 8.0$. A multiplexed driving is employed for driving the liquid crystal optical element.

23 Claims, 6 Drawing Sheets

LIQUID CRYSTAL OPTICAL ELEMENT AND A LASER PROJECTION APPARATUS USING POLYMER DISPERSED LIQUID CRYSTAL

BACKGROUND OF THE INVENTION

1. Field of the Invention

This invention relates to a liquid crystal optical element of a transparent and scattering type for controlling a near infrared ray laser beam and a laser projection apparatus employing the liquid crystal optical element.

2. Discussion of Background

As a projection apparatus employing a YAG laser, there are, for instance, a laser material processing apparatus for working an object, a marking apparatus for marking characters or figures, and the like, which are widely used. As the conventional technology, an apparatus for performing mechanical scanning by employing a scanner, an apparatus employing a fixed mask of a metal or the like, an apparatus employing a conventional twisted nematic (TN) type liquid crystal optical element as a mask and the like are pointed out.

For example, a transparent type liquid crystal element having polarizing plates and a laser marker which irradiates a laser beam reflected with a pattern information of the transparent type liquid crystal element on an object to be worked, are disclosed in Japanese Unexamined Patent Publication No. 11088/1989 (corresponding to U.S. Pat. No. 4,818,835).

Further, a laser marker employing an STN liquid crystal mask is described in Japanese Unexamined Patent Publication No. 241681/1990.

A laser marker provided with polarizers and optical fibers is described in Japanese Unexamined Patent Publication No. 193281/1991.

A laser marker which is characterized in that the laser marker is provided with both a fixed display portion and a liquid crystal performing variable display, is described in Japanese Unexamined Patent Publication No. 264178/1991.

A laser marker apparatus has recently been known which employs a transparent and scattering type liquid crystal optical element having an operational mode which is different from those of the above.

For instance, a laser letter marking apparatus employing a transparent and scattering type liquid crystal mask is described in Japanese Unexamined Patent Publication No. 180285/1991. Further, a laser marking apparatus employing a scattering type liquid crystal is described in Japanese Unexamined Patent Publication No. 241683/1992. However, there is no detailed description on the inner structure of a scattering type liquid crystal optical element in the laser letter marking apparatus.

In the conventional technology it is extremely difficult to mark arbitrary figures or characters, or work an arbitrary portion of object, and the laser marker apparatus is complicated by itself. In case of employing a TN type liquid crystal optical element, the arbitrarily of the apparatus is improved by controlling the switching-on and the switching-off of the respective pixels.

However, since two sheets of polarizer are employed in the TN type liquid crystal optical element, the coefficient of utilization of laser beam is low. Accordingly, the conventional technology has such drawbacks in that the sheets of polarizer are heated and are apt to be deteriorated by intensifying the laser beam.

A guest/host (GH) type liquid crystal optical element may be employed to cope with the drawbacks. However, the GH type liquid crystal optical element has the disadvantage of insufficient ON/OFF contrast ratio.

A system is proposed which employs a mask of a transparent and scattering type liquid crystal optical element which employs a liquid crystal and solidified matrix composite wherein liquid crystal is dispersed in a matrix. This transparent and scattering type optical element is provided with an advantage wherein the coefficient of utilization of laser beam is high and a high contrast ratio can be provided.

However, when the conventional liquid crystal and solidified matrix composite which is employed in the application in use of visible light wavelength region, is simply utilized, a characteristic thereof (such as threshold value characteristic) at the wavelength of near infrared ray, that is employed, is not sufficient, it is difficult to form a high density information at one time by a time-sharing (multiplexed) driving, and, therefore, a high processing and marking characteristics has not been achieved.

The multiplex driving is an indispensable driving method in forming an image by employing a number of pixels. The multiplexed driving is necessary even in case of low pixel numbers, for instance, in a 36×36 dots matrix, since the pixel number is 1296, and 1297 terminals are required in the static driving. By contrast, in the multiplexed driving, only 650 terminals are required in case of ½ duty, and 328 terminals, in case of ¼ duty.

However, in case of forming electrodes to perform the multiplex driving, when the pixel number exceeds a certain value, there causes inevitably overlapped portions wherein lines of segment electrodes and lines of common electrodes are overlapped. These overlapped portions of electrodes adversely influence a projected image.

SUMMARY OF THE INVENTION

It is an object of the present invention to solve the above drawbacks.

According to a first aspect of the present invention, there is provided a liquid crystal optical element of a transparent and scattering type for controlling a laser beam having approximately 1 μm of wavelength interposing a liquid crystal and solidified matrix composite in which nematic liquid crystal is dispersed and held in a solidified matrix between substrates having electrodes at least one of which is transparent, wherein the refractive index anisotropy Δn of the nematic liquid crystal is 0.18 or higher;

the viscosity η(cSt) thereof is equal to or less than 60; and a mean particle diameter R(μm) of the nematic liquid crystal dispersed and held in the solidified matrix and a gap d(μm) between the electrodes satisfy relationships of $$0.5 < \Delta n \cdot R < 1.3 \tag{1},$$

$$3.5 < \Delta n \cdot d < 8.0 \tag{2}.$$

According to a second aspect of the present invention, there is provided the liquid crystal optical element according to the first aspect, wherein the liquid crystal and solidified matrix composite is provided by photo-curing a uniform solution of the nematic liquid crystal and a photo-curable compound.

According to a third aspect of the present invention, there is provided the liquid crystal optical element according to the first aspect, wherein the refractive index anisotropy $\Delta n$ of the liquid crystal satisfies a relationship of $$0.20 < \Delta n < 0.29 \quad (3).$$

According to a fourth aspect of the present invention, there is provided the liquid crystal optical element according to the first aspect, wherein the refractive index anisotropy $\Delta n$ of the liquid crystal satisfies a first relationship of $$0.20 < \Delta n < 0.29 \quad (3),$$

and the dielectric constant anisotropy of the liquid crystal satisfies a second relationship of $$5 < \Delta \epsilon < 14 \quad (4).$$

According to a fifth aspect of the present invention, there is provided the liquid crystal optical element according to the first aspect, wherein the refractive index anisotropy $\Delta n$ of the liquid crystal, the mean particle diameter $R(\mu m)$ of the nematic liquid crystal dispersed and held in the solidified matrix and a number $D_1$ of liquid crystals per optical unit volume determined by $(1/\Delta n)^3 \ (\mu m^3)$ satisfy a relationship of $$0.8(R \cdot \Delta n)^{-3} < D_1 < 1.4(R \cdot \Delta n)^{-3} \quad (5).$$

According to a sixth aspect of the present invention, there is provided a laser projection apparatus comprising:

the liquid crystal optical element according to any one of the first through the fifth aspects, a driving means for driving the liquid crystal optical element;

a laser beam source;

a supply means for supplying a laser beam emitted from the laser beam source to the liquid crystal optical element; and a projection optical system for reduction projecting the laser beam from the liquid crystal optical element onto an object; wherein a reduction projection factor N whereby the image formed on the liquid crystal optical element is projected by 1/N and the gap $d(\mu m)$ between electrodes satisfy a relationship of $$d < 10 \times N \quad (6).$$

According to a seventh aspect of the present invention, there is provided a laser projection apparatus comprising:

the liquid crystal optical element according to any one of the first through the fifth aspects;

a driving means for driving the liquid crystal optical element;

a laser beam source;

a supply means for supplying a laser beam emitted from the laser beam source to the liquid crystal optical element; and a projecting optical system for reduction-projecting the laser beam emitted from the liquid crystal optical element onto an object to be projected;

said driving means for driving the liquid crystal element employing a multiplexed driving.

According to an eighth aspect of the present invention, there is provided a liquid crystal optical element of a transparent and scattering type for controlling a laser beam having approximately 1 $\mu m$ of wavelength interposing a liquid crystal and solidified matrix composite in which nematic liquid crystal is dispersed and held in a solidified matrix between substrates having electrodes at least one of which is transparent, wherein the refractive index anisotropy $\Delta n$ of the nematic liquid crystal is 0.18 or higher;

the viscosity $\eta(cSt)$ thereof is equal to or less than 60; and the nematic liquid crystal dispersed and held in the solidified matrix is provided with approximately an ellipsoid form;

a ratio of a first mean diameter $R_L$ in a long axis of said ellipsoid as compared with a second mean diameter $R_S$ in a short axis thereof, or an aspect ratio, $L = R_L/R_S$, is determined as $$1.3 \leq L \leq 2.5 \quad (7),$$

and a gap $d(\mu m)$ between electrodes is determined as $$3.5 \Delta n \cdot d < 8.0 \quad (2).$$

According to a ninth aspect of the present invention, there is provided a liquid crystal optical element of a transparent and scattering type for controlling a laser beam having approximately 1 $\mu m$ of wavelength interposing a liquid crystal and solidified matrix composite in which nematic liquid crystal is dispersed and held in a solidified matrix between substrates having electrodes at least one of which is transparent, wherein the refractive index anisotropy $\Delta n$ of the nematic liquid crystal 0.18 or higher;

the viscosity $\eta(cSt)$ thereof is equal to or less than 60; and the nematic liquid crystal dispersed and held in the solidified matrix is provided with approximately an ellipsoid form;

a ratio of a first mean diameter $R_L$ in a long axis of said ellipsoid as compared with a second mean diameter $R_S$ in a short axis thereof, or an aspect ratio, $L = R_L/R_S$, is determined as $$1.3 \leq L \leq 2.5 \quad (7),$$

the mean diameter value $R_M$ Of $R_L$ and $R_S$ is defined as $$R_M = (R_L + R_S)/2 \quad (8),$$

the refractive index anisotropy $\Delta n$ and said mean diameter value $R_M$ satisfy a first relationship of $$0.5 < \Delta n \cdot R_M < 1.3 \quad (9), \text{ or}$$

$$0.5 < \Delta n \cdot R_L < 1.3 \quad (9A),$$

and the refractive index $\Delta n$ and a gap $d(\mu m)$ between electrodes satisfy a second relationship of $$3.5 < \Delta n \cdot d < 8.0 \quad (2).$$

According to a tenth aspect of the present invention, there is provided the liquid crystal optical element according to the eighth or the ninth aspect, wherein the liquid crystal and solidified matrix composite is provided by photo-curing a uniform solution of the nematic liquid crystal and a photo-curable compound.

According to an eleventh aspect of the present invention, there is provided the liquid crystal optical element according to the eighth or the ninth aspect, wherein the refractive index anisotropy Δn of the liquid crystal satisfies a relationship of $$0.20 < \Delta n < 0.29 \quad (3).$$

According to a twelfth aspect of the present invention, there is provided the liquid crystal optical element according to the eighth or the ninth aspect, wherein the refractive index anisotropy Δn of the liquid crystal satisfies a first relationship of $$0.20 < \Delta n < 0.29 \quad (3),$$

and the dielectric constant anisotropy of the liquid crystal satisfies a second relationship of $$5 < \Delta \epsilon < 0.14 \quad (4).$$

According to a thirteenth aspect of the present invention, there is provided the liquid crystal optical element according to the eighth or the ninth aspect, wherein both $R_L$ and $R_S$ are in a range of 2 through 5 (μm).

According to a fourteenth aspect of the present invention, there is provided the liquid crystal optical element according to the eighth or the ninth aspect, wherein a number of $D_2$ (unit) of liquid crystal per optical unit volume determined by $(1/\Delta n)^3$ satisfy a relationship of $$0.8(R_M \cdot \Delta n)^{-3} < D_2 < 1.4(R_M \cdot \Delta n)^{-3} \quad (10).$$

According to a fifteenth aspect of the present invention, there is provided a laser projection apparatus comprising:

the liquid crystal optical element according to any one of the eighth through the fourteenth aspects;

a driving means for driving the liquid crystal optical element;

a laser beam source;

a supply means for supplying a laser beam emitted from the laser beam source to the liquid crystal optical element; and a projection optical system for reduction-projecting the laser beam emitted from the liquid crystal optical element onto an object to be projected; wherein a reduction projection factor N whereby the image formed on the liquid crystal optical element is projected by 1/N and the gap d(μm) between electrodes satisfy a relationship of $$d < 10 \times N \quad (6).$$

According to a sixteenth aspect of the present invention, there is provided a laser projection apparatus comprising:

the liquid crystal optical element according to any one of the eighth through the fourteenth aspects;

a driving means for driving the liquid crystal optical element;

a laser beam source;

a supply means for supplying a laser beam emitted from the laser beam source to the liquid crystal optical element; and a projecting optical system for reduction-projecting the laser beam emitted from the liquid crystal optical element onto an object to be projected;

said driving means for driving the liquid crystal element employing a multiplexed driving.

According to a seventeenth aspect of the present invention, there is provided a laser projection apparatus comprising:

a liquid crystal optical element which includes a liquid crystal and solidified matrix composite; in which nematic liquid crystal is dispersed and held in a solidified matrix having a refractive index which is substantially equal to the ordinary refractive index ($n_O$) of the liquid crystal used and is interposed between a pair of counter electrode substrates provided with counter electrodes comprising pixel electrodes and lead lines, wherein at least one of the counter electrodes substrate is transparent;

a multiplexed driving means for driving the liquid crystal optical element;

a laser beam source having an outout laser beam of approximately 1 μm wavelength;

a light supply means for transmitting the laser beam to the liquid crystal optical element; and a reduction type projection optical system for projecting the laser beam from the liquid crystal optical element onto an object with light reduction factor N;

characterized in that the lead line connected to a pixel electrode which functions as common electrode to supply select voltage to the pixel and is located on the one side of said substrates, is partially overlapped with the lead lines connected to the other pixel electrodes which function as segment electrode to supply data voltage to other pixels and are located on the other side of said substrates, wherein the narrower width $W_1$(μm) of the overlapped portion; and the said light reduction factor N; and gap length d(μm) between counter electrodes of liquid crystal optical element, satisfy a relationship of $$W_1 + d < 10 \times N \quad (11).$$

According to an eighteenth aspect of the present invention, there is provided the laser projection apparatus according to the seventeenth aspect, wherein a narrower distance $W_2$(μm) between two of the plurality of overlapped portions satisfies a relationship of $$W_2 < d/4 \quad (12).$$

According to a nineteenth aspect of the present invention, there is provided the laser projection apparatus according to the seventeenth or the eighteenth aspect, wherein the refractive index anisotropy Δn of the nematic liquid crystal is 0.18 or higher;

the viscosity η(cSt) thereof is equal to or less than 60; and the refractive index anisotropy Δn, a mean particle diameter R(μm) and a gap d(μm) between electrodes satisfy relationships of $$0.5 < \Delta n \cdot R < 1.3 \quad (1),$$

$$3.5 < \Delta n \cdot R < 8.0 \quad (2).$$

According to a twentieth aspect of the present invention, there is provided the laser projection apparatus according to any one of the seventeenth through the nineteenth aspects, wherein an overlapped portion is formed by crossing lead lines at which a lead line of a common electrode to supply select voltage to a pixel is intersected with the lead lines of segment electrodes to supply data voltage to other pixels in the vicinity of the pixel; and the sum value $S_X$ of said overlapped portion area and an effective pixel area $S_P$ of the pixel satisfy a relationship of $$0.001 \leq S_X/S_P \leq 0.05 \qquad (13).$$

DETAILED DESCRIPTION OF THE PREFERRED EMBODIMENTS

Figure 1:
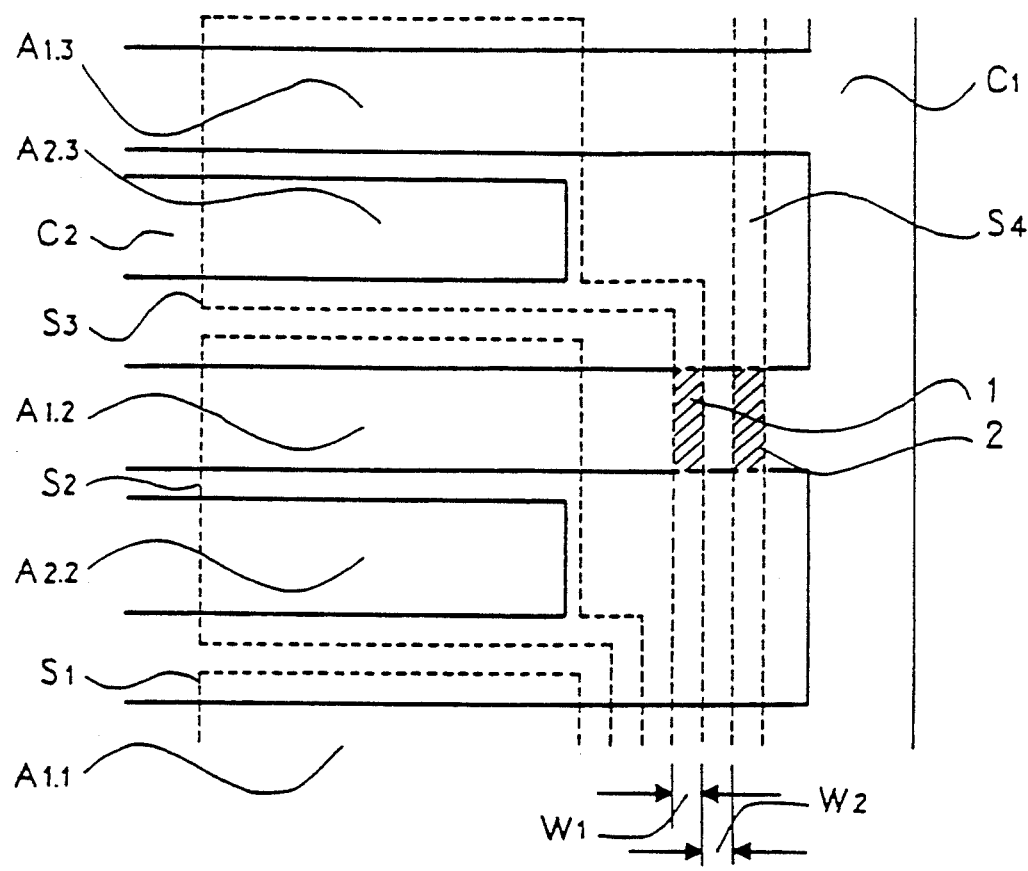
FIG. 1 is a partially magnified plane view showing an arrangement construction of electrodes of a liquid crystal optical element according to the present invention.

A liquid crystal optical element of this invention can efficiently control a near infrared ray laser beam with little transmittance loss, since the element interposes a liquid crystal and solidified matrix composite which is composed of nematic liquid crystal and a solidified matrix, between substrates having electrodes at least one of which is transparent. Therefore, working or marking of an object to be projected can easily be performed by employing a laser beam projection apparatus.

The followings are characteristics required for masks employing a liquid crystal and solidified matrix composite for controlling a near infrared ray laser beam with high density by the laser projection apparatus.

(1) High transmittance in switching-on.
(2) High scattering property in switching-off.
(3) Threshold value characteristic suitable for multiplexed driving.
(4) The above characteristics are achieved at wavelength of near infrared ray laser beam, for instance, the wavelength of a YAG laser beam (1.064 μm).

Conventionally, in a liquid crystal display element employing a liquid crystal and solidified matrix composite, which is employed in a projection type display apparatus, the conditions of the transmittance in switching-on and the scattering property in switching-off, are achieved with respect to the visible light.

However, it is necessary to solve a new problem to provide an element which satisfies all of the above characteristics under the condition of near infrared ray laser beam. A specific explanation will be given of the conditions for achieving the transmittance in switching-on, the scattering property in switching-off and the threshold value characteristic that is suitable for the multiplexed driving, under these conditions, as follows.

Further, the wavelength of near infrared light in this invention, is in a range of 0.7 μm to 2.5 μm, particularly 0.75 μm to 1.5 μm.

Laser is a means of generating a near infrared ray. Specifically as near infrared ray laser, there are a YAG laser, a semiconductor laser (having wavelength of 0.84 μm of GaAs, that of a compound semiconductor of III-V group or II-VI group, 0.9 μm of InP etc. ), various solid state lasers (for instance, Nd glass laser; about 1.06 μm wavelength), a wavelength variable laser and a wavelength converted laser.

The laser apparatus is characterized in that irrespective of a laser medium, the laser apparatus can finely control a laser beam having high energy density in a specified wavelength range in the near infrared wavelength band, with low loss.

This invention is mainly concerned with an inner construction of a liquid crystal optical element in relation to its laser wavelength band, in case of a YAG laser projection apparatus which is especially employed in working or marking of an object to be projected. In this invention, a laser beam having a wavelength of approximately 1 μm indicates a laser beam having a wavelength in the vicinity of 1 μm (0.8 to 1.2 μm, preferably 0.9 to 1.1 μm) such as a YAG laser beam.

The condition of the high transmittance in switching-on of a liquid crystal optical element, is achieved by a good agreement between the refractive index of a liquid crystal and the refractive index of a solidified matrix in about 1 μm wavelength of near infrared ray laser beam, when liquid crystals are arranged in the direction of electric field by voltage application.

The condition of the high scattering property in switching-off of the liquid crystal optical element, is achieved by a construction of the liquid crystal and solidified matrix composite which maximizes the forward scattering intensity, in wavelength of a near infrared ray laser beam. Further, the condition of the threshold value characteristic which is suitable for the multiplexed driving, is achieved by the facts wherein the respective threshold value characteristics of liquid crystal particles dispersed in the matrix are not widely distributed, that is, the particle distribution is small, and a suitable gap between electrodes (thickness of the liquid crystal and solidified matrix composite) is provided.

In view of the above points, the important element parameters of a liquid crystal optical element employing the liquid crystal and solidified matrix composite are specifically, the refractive index $n_{LC}$ of employed crystal and its anisotropy Δn, the viscosity η(cSt), a mean particle diameter R(μm) of liquid crystal particles dispersed and held in a solidified matrix, a gap d(μm) between electrodes, the refractive index $n_M$ of the solidified matrix and the like. An excellent characteristic is achieved by optimizing these factors with respect to the wavelength of the laser beam. On top of these, it is preferable to optimize the dielectric constant anisotropy Δε of employed liquid crystal, the elastic modulus and the like. Further, these values of physical property are measured values with respect to the visible light under an environmental temperature (normally room temperature) wherein the element is employed, so far as no special mention is given thereto.

Figure 5:
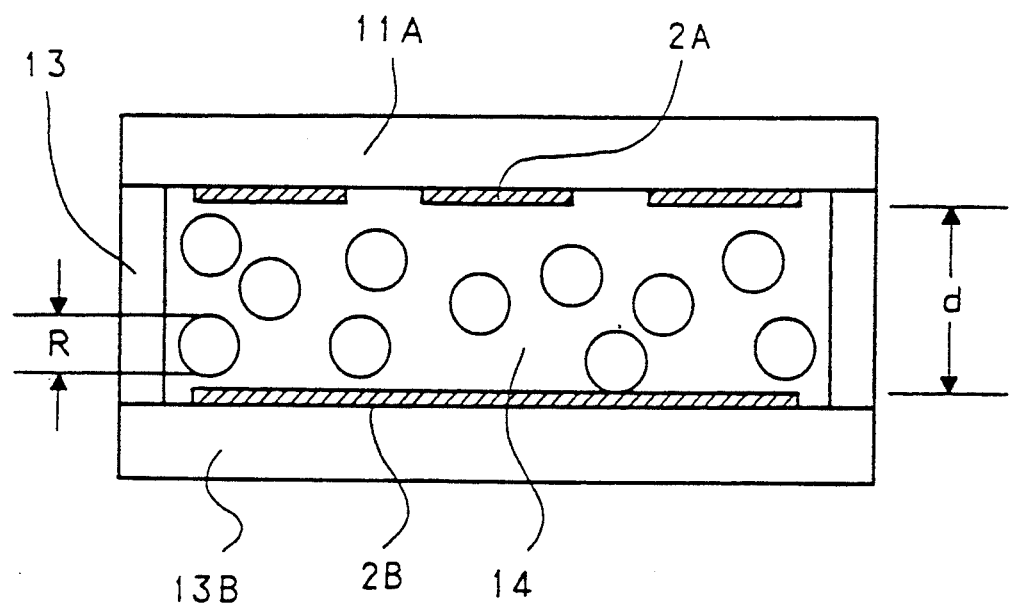
FIG. 5 is a sectional diagram of a basic construction (second example) of a liquid crystal optical element according to the present invention.

FIG. 5 shows an example of a sectional diagram of a liquid crystal optical element of this invention. In FIG. 5, notations 11A and 13B designate substrates of glass, plastic or the like, 2A and 2B, transference electrodes of $In_2O_3$-$SnO_2$ (ITO), $SnO_2$ or the like which are provided on the surfaces of the substrates, 13, a sealing member for sealing the surrounding of the substrates, and 14, a liquid crystal and solidified matrix composite wherein nematic liquid crystal is dispersed and held in a solidified matrix.

Further, notation R designates a particle mean diameter of a liquid crystal particle, and d, a gap between electrodes. In FIG. 5, the liquid crystal particles dispersed in the liquid crystal and solidified matrix composite 14 are in a form of a completely independent spherical capsule. However, the liquid crystal particle may be in a porous form, or the respective particles are communicated with each other, or the section of particle may be of an elliptic shape, as mentioned later.

In the liquid crystal optical element employed in this invention, the liquid crystal and solidified matrix composite composed of a solidified matrix formed with a number of fine pores and nematic liquid crystal filled in the hole portions, is interposed between the couple of substrates having electrodes. By the application of voltage between these electrodes, the refractive index of the liquid crystal changes, and the relationship between the refractive index of the solidified matrix and the refractive index of the liquid crystal changes. When the refractive indices agree with each other, the liquid crystal optical element is in a light transmittant state, whereas, when the refractive indices are different with each other, the liquid crystal optical element is in a light scattering state. Further, when the solidified matrix is swelled by the liquid crystals, the refractive index of the solidified matrix is a refractive index in its swollen state.

The liquid crystal and solidified matrix composite composed of the solidified matrix formed with a number of fine pores and the liquid crystal filled in the hole portions, is provided with a structure wherein the liquid crystal is enclosed in a vacuole like a microcapsule. However, the individual microcapsule may not be completely independent. Or, the vacuoles of the individual liquid crystal may be communicated with each other through small clearances as in a porous body.

In the liquid crystal and solidified matrix composite which is employed in the liquid crystal optical element of this invention, the nematic liquid crystal and a curable compound which forms the solidified matrix, are mixed together into a solution-like state or a latex-like state, which is cured by a photo-curing, a thermosetting, a curing by removing solvent, or a curing by reaction, thereby separating a cured substance, whereby the nematic liquid crystal is dispersed in the solidified matrix.

It is preferable that this curable compound is of a photo-curing or a thermosetting type, since the compound can be cured in a closed system. Especially, it is preferable to employ the photo-curing type curable compound since the compound is not influenced by heat and can be cured in a short period of time.

As a specific method of making the invented liquid crystal optical element, a cell is formed by employing a sealing member as in the conventional normal nematic liquid crystal, an uncured mixture of the nematic liquid crystal and a curable compound is injected into an injection port, and after sealing the injection port, the mixture can be cured by light irradiation or by heating it.

Further, in case of the liquid crystal optical element of this invention, it is possible that in making the liquid crystal optical element, the sealing member is not employed, and for instance, the uncured mixture of the nematic liquid crystals and the curable compound is supplied on a substrate having an electrode and thereafter, the other substrate having an electrode is laminated thereon, and the whole assembly is cured by the light irradiation or the like.

Naturally, the surrounding may be sealed thereafter by painting a sealing member at the surrounding. According to this method, the uncured mixture of the nematic liquid crystal and the curable compound is supplied by a roll coating, a spin coating, a printing, a painting by a dispenser and the like. Therefore, the injection step is convenient and the productivity is extremely improved.

Further, the uncured mixture of the nematic liquid crystal and the curable compound may be added with spacers such as ceramic particles, plastic particles, glass fibers or the like for adjusting the gap between substrates, and additive agents such as pigments, colorants, a viscosity controlling agent or an additive agent which does not adversely influence the function of this invention.

In this invention, the refractive index of the solidified matrix agrees with the refractive index of the employed liquid crystal in either of the voltage application state or the voltage non-application state, whereas the refractive index of the solidified matrix disagrees with the refractive index of the employed liquid crystal in the reverse state. In this way, light transmits therethrough when the refractive index of the solidified matrix and the refractive index of the liquid crystal agree with each other, whereas light scatters (white turbidity) when both disagree with each other. The scattering property of this element is higher than in a case of a DS (Dynamic Scattering) mode liquid crystal display element and a high contrast ratio is provided.

In this invention, it is preferable that the refractive index $n_M$ of the solidified matrix agrees with an ordinary light refractive index $n_O$ of employed liquid crystal when the voltage is applied thereon, by which the element is in a transparent state in application of voltage. Therefore, the transmittance in transmitting light is improved and light transmits therethrough uniformly. Therefore, the contrast ratio is improved.

It is an object of the present invention to provide an optimal construction of a liquid crystal optical element employing the liquid crystal and solidified matrix composite which is suitable for controlling a near infrared ray laser beam. The factors for determining the electro-optical characteristic of the liquid crystal optical element employing this liquid crystal and solidified matrix composite, are the refractive index (ordinary light refractive index $n_O$, extraordinary light refractive index $n_E$) of employed liquid crystal, the viscosity $\eta$, the refractive index $n_M$ of the solidified matrix, the mean particle diameter R of liquid crystal dispersed and held in the solidified matrix, and a gap d (thickness of the liquid crystal and solidified matrix composite) between substrates having electrodes.

Further, it is preferable to optimize the relative dielectric constant and the elastic modulus of the liquid crystal, the relative dielectric constant $\epsilon_M$ and the elastic modulus of the employed solidified matrix, the volume fraction $\Phi$ of the liquid crystal dispersed and held in the solidified matrix, the maximum effective applied voltage V for driving and the like.

When the liquid crystal is of an independent particle or particles of which portions communicate with each other, the mean particle diameter R of liquid crystal indicates the maximum diameter of the particle in this invention. In case of a structure wherein many liquid crystal particles communicate with each other, it indicates the maximum diameter of the liquid crystal in a region wherein directions of directors of the liquid crystal are correlated with each other.

It is preferable that the liquid crystal which is dispersed and held in the solidified matrix exist in some forms such as independent particles or contiguous particles whose portions communicate with each other in part, by which it is possible to drive the liquid crystal optical element at low voltage and which is effective in performing a high scattering property which is compatible with a high transmittance.

The electro-optical characteristic of the liquid crystal optical element employing the liquid crystal and solidified matrix composite of this invention, is desirable to be provided with the high scattering property either in voltage application or in voltage non-application, and the high transmittance in the reverse state, that is, a high constant ratio. When a projection apparatus is constructed by employing such a liquid crystal optical element, the projection apparatus can be provided with the high transmittance (which effectively utilizes light quantity of a light source) and the high contrast ratio.

It is the most considerable object of this invention to provide a liquid crystal optical element employing a liquid crystal and solidified matrix composite showing the high contrast ratio (ON/OFF ratio). An explanation will be given of an example of a liquid crystal optical element which is in a transparent state in application of voltage, by making the refractive index $n_M$ of the solidified matrix agree with the ordinary light refractive index $n_O$ of employed liquid crystal.

The refractive index anisotropy $\Delta n$ of the employed liquid crystal contributes to the scattering property in non-application of voltage. This anisotropy is preferably larger than a certain degree to obtain the high scattering property. Specifically $\Delta n \geq 0.18$, and preferably $\Delta n \geq 0.20$. On the other hand, too much An is disadvantageous in view of the transparency in switching-on and a sharp threshold value characteristic suitable for multiplexed driving. Therefore, it is preferable that $\Delta n \leq 0.29$. These conditions are provided in consideration of the wavelength dispersion of the refractive index (generally, the longer the wavelength, the smaller the refractive index) of the liquid crystal.

Further, it is preferable that the ordinary light refractive index $n_O$ of employed liquid crystal approximately agrees with the refractive index $n_M$ of the solidified matrix, whereby a high transparency is provided in application of voltage. Specifically, it is preferable to satisfy a relationship of $n_O - 0.03 < n_M < n_O + 0.05$.

The mean particle diameter R of the liquid crystal dispersed and held in the solidified matrix is a very important factor, which contributes to the scattering property in non-application of voltage and an operational characteristic of the liquid crystal in application of voltage. The scattering property in non-application of voltage, is changed by the refractive index anisotropy $\Delta n$ of employed liquid crystal, the wavelength of light $\lambda$, and the mean particle diameter R of the liquid crystal. The scattering property per unit operational liquid quantity when $\lambda$ is in the visible light region, is maximized, when the mean particle diameter R ($\mu m$) satisfies the following relationship.

$$0.5 < \Delta n \cdot R < 1.3 \tag{1}$$

A high contrast ratio is provided in the above range, since a strong scattering can be provided in the near infrared region.

When the mean particle diameter R is smaller than the range of equation (1), the response speed becomes faster, but the scattering ability per unit operational liquid crystal quantity is lowered and the voltage necessary for driving becomes high. Conversely, when the mean particle diameter R is larger than the range of equation (1), the driving can be performed at a low voltage, but the scattering ability per unit operational liquid crystal quantity is lowered and the response speed becomes slow.

It is preferable that the particle diameter of the liquid crystal is uniform. When there is a distribution in the particle diameter, the large liquid crystal particles contribute to the lowering of the scattering property and the small liquid crystal particles, the elevation of the driving voltage, which amounts to the elevation of the driving voltage and the lowering of the contrast, as a result. The dispersion $\sigma$ of the particle diameter is preferably within 0.25 times as much as the mean particle diameter and more preferably within 0.15 times thereof. Incidentally, the mean particle size and the dispersion are respectively a mean value and a dispersion value weighted by volume.

Particularly, with respect to a YAG laser beam (wavelength is about 1.064 $\mu m$), the preferable range is as follows.

$$0.7 < \Delta n \cdot R < 1.1 \tag{14}$$

It is particularly preferable that $\Delta n \cdot R$ is about 0.8.

In this case, a scattering suitable for the YAG laser wavelength can be caused and a high contrast ratio can be achieved.

The thickness of the liquid crystal and the solidified matrix composite, that is, the gap d($\mu m$) between electrodes is also an important factor. When d is large, the scattering property in non-application of voltage is improved and the threshold value characteristic becomes sharp. However, when d is too large, a high voltage is required to achieve the sufficient transparency in application of voltage, which amounts to an increase in power consumption, a problem wherein a driver IC for a conventional TN liquid crystal display element can not be employed or a problem wherein the threshold value characteristic is deteriorated. Further, when d is small, a high transparency can be obtained at a low voltage, but the scattering property in non-application of voltage is reduced.

Accordingly, it is preferable to satisfy the following relationship.

$$3.5 < \Delta n \cdot d < 8.0 \tag{2}$$

The high scattering property in switching-off, the high transmittance in switching-off and the good threshold value characteristic can be provided by satisfying the above relationship.

When projection is performed by employing a mask of the liquid crystal optical element in use of the optimized liquid crystal and solidified matrix composite and working or marking of figures, characters or the like is performed, the magnification in projecting an image formed on the mask to an object to be projected, is important. Normally, spacers such as fibers or beads having a uniform diameter are dispersed for controlling the gap between electrodes. It is preferable that the projection is performed in a range wherein these spacers do not influence the projected image.

In case of a liquid crystal optical element for controlling a YAG laser beam, which is different from a display wherein the normal visible light is controlled, some cautions are required in the following points.

(a) The wavelength thereof is longer than that of the visible light.

(b) The light is coherent.

In the conventional liquid crystal and solidified matrix composite, an angle modulation of light ray (change in the progressing direction of light ray) called scattering of light has mainly been performed, and the modulation of brightness is performed according to the degree of the angle modulation.

However, in controlling the YAG laser beam, since the wavelength is long, the YAG laser beam passes through the scattering bodies of liquid crystal particles, in case of the liquid crystal and solidified matrix composite for the visible light.

Therefore, it is necessary to satisfy specified optical conditions such as the particle diameter and the gap between electrodes.

Further, it is possible to modulate the intensity of light by modulating the phase of progressing laser beam, owing to the characteristic of laser beam which is coherent as mentioned in (b).

This is achieved by providing a plurality of spatial regions having different refractive indices in an order of the equal length to or more than the wavelength.

In other words, when independent other liquid crystal particles are present in the vicinity of a certain liquid crystal particle and the progressing lights are spatially different with respect to their phases, the phases of lights emitted from the liquid crystal optical element are finally and approximately random and the coherency is lost.

In this case, the intensity of light becomes very small even when the lights do not receive the angular modulation.

It is necessary that "optical density" (which is different from the normal density and which is the density of particles for causing the modulation of beam) of the liquid crystal particles is large with a certain amount of optimum, to sufficiently achieve this phase modulation.

The optical density is defined as a number of liquid crystal particles (density) in a cubic body (volume $V = Y^3$ ($\mu m^3$)) having a side length Y which is determined by $Y = 1/\Delta n$ ($\mu m$) with respect to the refractive index anisotropy $\Delta n$ of the liquid crystal which causes the phase modulation.

In the above definition, Y is a length of an order wherein a shift of phase of one wavelength at maximum is caused between a light progressing in the solidified matrix and a light progressing in the liquid crystal.

Accordingly, when the liquid crystal particles present in the cubic body which is determined by the length Y are very rare, the possibility of causing the phase change is extremely low and the laser beam undergoes little change of state compared with that of incidence and passes through the liquid crystal optical element.

Conversely, when this density is very large, the liquid crystal particle is connected with a contiguous liquid crystal particle thereby forming a complete continuous, or particles having extremely small particle diameter compared with the above scale are present in a great number, which amounts to the lowering of contrast and the elevation of driving voltage.

In this viewpoint, the range of the optimized value of $D_1$ is determined by the following relationship.

$$0.8(R \cdot \Delta n)^{-3} < D_1 < 1.4(R \cdot \Delta n)^{-3} \tag{5}$$

Even if the shape of liquid crystal particles is provided with approximately an ellipsoid form, the mean value $R_M$ in replace of R is substantially applied for above relationship (5).

Normally, the gap between electrodes is approximately 10 $\mu m$ or less in the conventional TN type liquid crystal optical element and the like. However, a rather thick gap between electrodes is necessary for the transparent and scattering type liquid crystal optical element employing the liquid crystal and solidified matrix composite of this invention to obtain a sufficient scattering property. Accordingly, since the spacers for controlling the gap between electrodes become large, it is necessary that the nonuniformity in the vicinity of the spacers is not projected or does not cause a problem even if it is projected. For instance, when the liquid crystal of $\Delta n = 0.22$ is employed, the gap between electrodes is approximately 15 through 35 $\mu m$, or equal to or more than 17 $\mu m$, further, equal to or more than 20 $\mu m$, in many cases. Further, the nonuniformity in the vicinity of the spacers is much different from that in the conventional TN type liquid crystal optical element due to the scattering type characteristic.

To remove the adverse influence due to the above nonuniformity in a projected image, it is necessary that a reduction projecting ratio N (wherein the laser beam is reduced by 1/N on the object to be projected) of an image formed on the liquid crystal optical element and the gap $d(\mu m)$ between electrodes of the liquid crystal optical element satisfy the following relationship.

$$d < 10 \times N \tag{6}$$

In the above range, the nonuniformity can be restricted to the degree which is the same with that of a conventional liquid crystal display element wherein the reduction projection is not performed thereby diminishing the adverse influence. The relationship of (6) is determined by a consideration not only of the size of spacers but also the change of scattering state of the liquid crystal and solidified matrix composite in the vicinity of the spacers.

Further, the reduction projecting ratio N is in a range of 5 through 40, preferably 9 through 30.

Actually, the gap between electrodes is determined in accordance with a desired reduction projecting ratio. Based on the above relationship, a pertinent liquid crystal and a pertinent liquid crystal particle diameter can be selected. Naturally, when the spacers for controlling the gap between electrodes are not dispersed to pixels which are portions for forming an image, a large magnification (small reduction projection ratio) can be adopted.

The other properties of employed liquid crystal material are important. The dielectric constant anisotropy $\Delta\epsilon$ of liquid crystal material determines the driving voltage and is a quantity which concerns the hysteresis characteristic in the voltage-transmittance characteristic of the liquid crystal and solidified matrix composite. It is preferable to determine the dielectric constant anisotropy $\Delta\epsilon$ from the driving voltage and the hysteresis characteristic as follows.

$$5 < \Delta\epsilon < 14 \quad (3)$$

A driver IC which is employed in the conventional TN type liquid crystal display element can be unitized, when a liquid crystal having $\Delta\epsilon$ of more than 5 is employed and the liquid crystal and solidified matrix composite of the above construction is formed.

Further, the after image due to the hysteresis characteristic is difficult to cause by employing a liquid crystal having $\Delta\epsilon$ of less than 14. Thereby, it is possible to form a liquid crystal and solidified matrix composite wherein the after image is not caused even when an erase signal is not inputted in case of rewriting information and the rewriting of image can be performed at a high speed. Naturally, even a liquid crystal having $\Delta\epsilon$ of larger than the above value can be employed by using the erase signal whereby the voltage of the total surface is rendered to 0 V.

The viscosity $\eta$(cSt) of liquid crystal strongly influences the rewriting speed of information. Generally, the larger the particle diameter of encapsulated liquid crystal, the more retarded the transition from switching-on to switching-off. In the optimum construction of the present invention for controlling near infrared ray, the optimum particle diameter of encapsulated liquid crystal is larger than that in the visible light. Therefore, it is preferable to employ a liquid crystal material having low viscosity. Particularly, the viscosity of liquid crystal $\eta$ is determined to be equal to or less than 60 cSt to achieve a response of several tens msec.

Distorting the shape of the liquid crystal can be utilized for improving the response performance. Specifically, it is preferable for improving the response performance that, in case of regarding the shape of the liquid crystal particle as ellipsoidal, and a ratio of the diameter $R_L$ in the long axis direction as compared with the diameter $R_S$ in the short axis direction (aspect ratio, $L = R_L/R_S$) satisfies the following relationship.

$$1.3 \leq L \leq 2.5 \quad (14)$$

The response time is shortened when L is equal to or more than 1.3. However, when L is too large, the threshold value characteristic comes dull, and therefore, the voltage-transmittance characteristic is not suitable for the multiplexed driving.

And the ellipsoidal liquid crystal particles are at random arranged very much in element, the relationship (9) $0.5 < \Delta n \cdot R_M < 1.3$ is more applied for. Because it is preferable that in a plane cut in the direction perpendicular to the surface of the electrodes, the direction of the long axis of each liquid crystal particle is substantially random in the two-dimensional space. It is much preferable that the direction is substantially random in the three-dimensional space.

Further, with respect to the operable volume fraction $\Phi$ of liquid crystal of the liquid crystal and solidified matrix composite, it is preferable that $\Phi > 20\%$ in view of the scattering property, $\Phi > 35\%$ in view of higher scattering property, and further $\Phi > 45\%$. On the other hand, when $\Phi$ is too large, the structural stability of the liquid crystal and solidified matrix composite is deteriorated. Therefore, it is preferable that $\Phi < 70\%$.

In one of the liquid crystal optical elements of this invention, wherein the refractive index of the solidified matrix agrees with the normal light refractive index $n_O$ of employed liquid crystal, shows a scattering state, that is (white turbidity state) due to a difference between the index of the liquid crystal which is not parallely aligned as a whole in a constant direction and that of the solidified matrix, when the voltage is not applied.

Accordingly, when the liquid crystal optical element is employed for a projection apparatus as in this invention, light is scattered at a portion having no electrode and the light does not reach the object to be projected even if the portion other than the pixel portion is not provided with a light shielding layer. Accordingly, it is not necessary to shield the portion other than the pixel electrode by the light shielding layer and the like to prevent the leak of light from the portion other than the pixel electrode, whereby the invention is provided with an advantage wherein a step of forming the light shielding layer is dispensed with.

The voltage is applied on desired pixels. The liquid crystal (molecules) is arranged in alignment with a constant direction at the pixel portions applied with the voltage. Thereby, the ordinary light refractive index $n_O$ of the liquid crystal and the refractive index of the solidified matrix $n_M$ agree with each other, the liquid crystal optical element is in a transparent state, light passes through at the desired pixels and the near infrared ray from a light source reaches the object to be projected.

It is possible that by curing a specified portion of the liquid crystal optical element under a state wherein a sufficiently high voltage is applied, in the curing step, the specified portion can be rendered in a permanent transparent state. Therefore, in case of always projecting a constant image, for instance, a company name, a commercial name and the like, such an always transparent portion may be formed.

Figure 2:
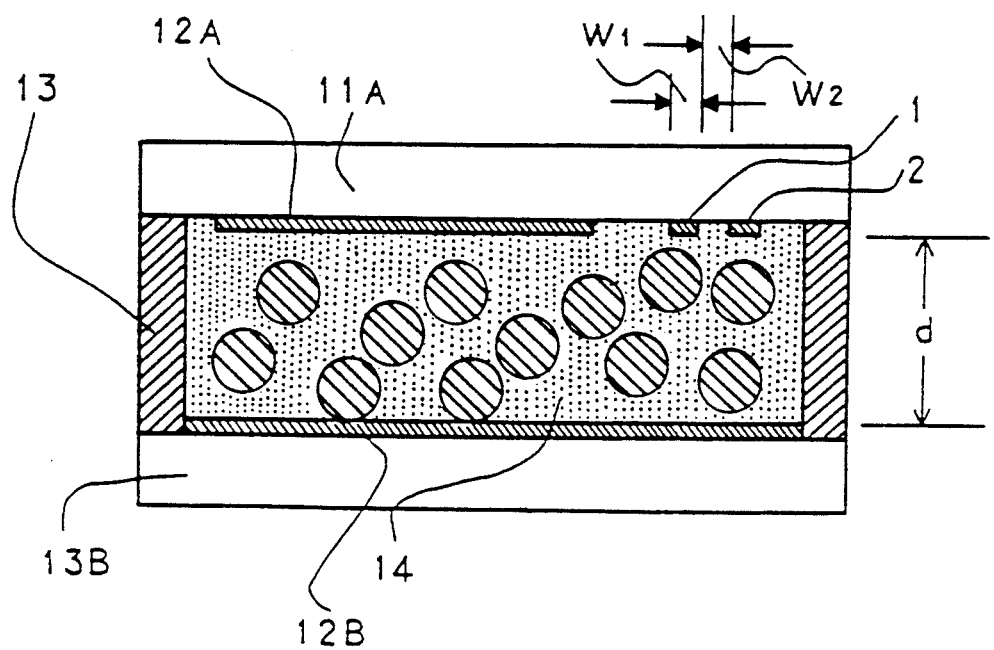
FIG. 2 is a sectional diagram showing a basic construction (first example) of a liquid crystal optical element according to the present invention.
Figure 4:
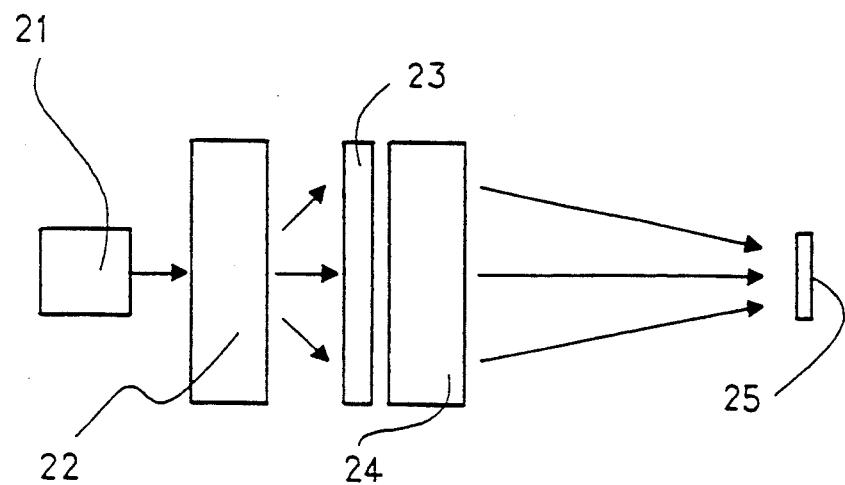
FIG. 4 is a schematic diagram showing a basic construction of a projection apparatus according to the present invention.

FIG. 4 is a schematic diagram of a projection apparatus which performs a reduction projection employing the liquid crystal optical element of FIG. 2. In FIG. 4, reference numeral 21 designates a laser beam source (specifically, YAG laser beam source) for generating a near infrared ray laser beam, 22, a supply means for expanding the near infrared ray laser beam emitted from the laser beam source and supplying the expanded laser beam to the liquid crystal optical element, 23, the liquid crystal optical element of the liquid crystal and solidified matrix composite, 24, a projecting optical system for reducing and projecting an image formed by the liquid crystal optical element, and 25, an object. Further, although not shown in FIG. 4, to exclude a diffused beam among the beam emitted from the liquid crystal optical element 23, an aperture or a spot which is a perforated plate, is disposed in the projection optical system or between the projection optical system and the object to be projected.

It is another object of the present invention to form and project an image having a high density by a liquid crystal optical element employing the liquid crystal and solidified matrix composite.

As a simple matrix liquid crystal optical element wherein high density information can be written, conventionally, a liquid crystal optical element employing polarizers such as a TN type liquid crystal optical element, a STN type liquid crystal element or the like is well known, in which the high density information display can be performed by the multiplexed driving.

In these liquid crystal optical elements, a high density operation of 1/50, 1/100 and 1/200 duty is normally performed. However, these liquid crystal optical elements are provided with a drawback wherein the loss of light transmitting quantity is considerable since the polarizers are used. Further, in case of handling a large quantity of light as in the laser projection apparatus, thermal deformation or deterioration of the polarizers is apt to be caused.

On the other hand, since the threshold value characteristic of the voltage-transmittance characteristic is duller than those of these optical elements, in the liquid crystal optical element employing the liquid crystal and solidified matrix composite, it is extremely difficult to perform the high density operation of 1/50, 1/100 and 1/200 duty.

However, the above element is provided with an advantage wherein the element itself is difficult to deteriorate even when a large quantity of light is employed, since it is a transparent and scattering type element and the absorption of light is not caused. The driving of the above element pixel by pixel by the static driving or the increase of the number of pixels by a low duty multiplexed driving has been tried. However, there are problems wherein a sufficient aperture ratio can not be provided, and the like since the lead line pattern is extremely complicated.

In this invention, a structure of the liquid crystal optical element is shown which is suitable for a laser projection apparatus which reduces and projects an image formed by the liquid crystal optical element by a near infrared ray laser beam such as a YAG laser beam.

Particularly, an element structure is shown which enables a sufficiently precise and high-density information writing even in the multiplexed driving of low duty (⅛ through 1/16, preferably about ⅛ through ⅛).

In the multiplex driving, generally, an electrode pattern of element is formed by segment electrodes integrating a plurality of pixels and corresponding common electrodes. In this case, there causes portions which are the portions other than the pixel, wherein lines of segment electrodes and lines of common electrodes are overlapped with each other.

It is necessary that the overlapped portions are in a scattering state since they are originally the portions other than the pixels. However, depending on the voltage application state of the both electrodes, the overlapped portions are in a transparent state and light is projected therethrough by leakage.

In a conventional display, to prevent the undesired leakage of light between the pixels (virtual pixels by overlapping), normally a light shielding layer called a black matrix formed by a metal such as chromium or a light absorbing body is formed in matrix thereby preventing the lowering of contrast.

In case of a normal display for visible light, even when the overlapped portions by the segment electrodes and the common electrodes of different pixels are caused, it is possible to prevent the lowering of display quality such as the lowering of contrast by covering the overlapped portions by a black matrix as disclosed in this specification.

However, in case of an application such as a laser projection apparatus wherein a high energy light passes through a liquid crystal optical element, it is difficult to employ the black matrix since the black matrix suffers a damage due to thermal absorption and causes a further lowering of the aperture ratio.

The present invention provides a liquid crystal optical element capable of performing a display of high-density, high-contrast, high-aperture-ratio and low-loss display even in driving at a low duty, without employing the black matrix, and a laser projection apparatus for reducing and projecting the display of the liquid crystal optical element to an object thereby performing high quality marking or working.

A further explanation will be given in reference to the drawings.

FIG. 1 is a partially magnified plane view showing overlapped portions of electrodes of a liquid crystal optical element employed in a laser projection apparatus of this invention.

In FIG. 1, common electrodes are shown by bold lines and segment electrodes opposing the common electrodes are shown by dotted lines. FIG. 1 shows an example of ⅛ duty and shows two common electrodes $C_1$ and $C_2$ and four segment electrodes $S_1$ through $S_4$. An opposing portion of the common electrode $C_1$ and the segment electrode $S_1$ designates a pixel $A_{1,1}$, an opposing portion of the common electrode $C_2$ and the segment electrode $S_2$, a pixel $A_{2,2}$, an opposing portion of the common electrode $C_1$ and the segment electrode $S_2$, a pixel $A_{1,2}$, an opposing portion of the common electrode $C_2$ and the segment electrode $S_3$, $A_{2,3}$, and an opposing portion of the common electrode $C_1$ and the segment electrode $S_3$, a pixel $A_{1,3}$.

In the example of FIG. 1, for instance, lines of the segment electrode $S_3$ and lines of the common electrode $C_2$ which lead to the pixel $A_{1,2}$, are overlapped with each other at an overlapped portion 1. Similarly, lines of the segment electrode $S_4$ and lines of the common electrode $C_2$ which lead to the pixel $A_{1,2}$, are overlapped with each other at an overlapped portion 2. When a voltage is applied to some degree or more between the common electrodes and the segment electrodes, these overlapped portions are in a transparent state in response thereto. Therefore, light leaks at the overlapped portions. The area of the overlapped portion is defined as $S_X$.

The narrower width of the overlapped portion (which is the narrower width of a figure formed by the lines of the segment electrode and the lines of the common electrode; in this example, the same with the width of the lines of the segment electrode) is defined as $W_1(\mu m)$. In case wherein the both lines obliquely intersect with each other, the overlapped portion is a parallelogram, and therefore, the narrower one of a width thereof in the orthogonal direction of the respective sides, is defined as $W_1$. Further, a narrower distance between the overlapped portion and a contiguous overlapped portion is defined as $W_2(\mu m)$.

Normally, the lead line pattern is determined such that no overlapped portions are caused. However, when the liquid crystal optical element is provided with a high density at a low duty, the lead line pattern becomes extremely complicated. Therefore, the aperture ratio of pixel is reduced to dispense with the overlapped portion.

Conversely, a liquid crystal optical element having the high density and the high aperture ratio can be achieved when a construction is established wherein no problem is caused in a projected image, even when the overlapped portions causing an operational uncertainty in the display region are present which function as noises. In this invention, these problems are avoided and the high density and the high-aperture-ratio are achieved when a special construction is adopted, since the liquid crystal optical element employs the liquid crystal and solidified matrix composite wherein the liquid crystal is dispersed and held in the solidified matrix.

Since the above overlapped portions (area $S_X$) function as noises with respect to the pixel information, a small area ratio thereof as compared with that of the pixel is preferable. However, reducing this region amounts to limiting of supply current to the electrode. Accordingly, the area is determined by the pattern and arrangement of pixels and a number of pixels.

In performing the high density display at a duty ratio of $\frac{1}{4}$ through 1/16, a condition for achieving the high quality letter marking is that the area $S_X$ of the overlapped portion(the total of the areas of overlapped portions when a plurality of overlapped portions are present in a single pixel region) is preferably equal to or more than 0.1% and equal to or less than 5%, with respect to an effective area $S_P$ of the pixel, more preferably, equal to or more than 0.2% and equal to or less than 3%.

FIG. 2 shows an example of a sectional diagram of a liquid crystal optical element employed in a laser projection apparatus of this invention.

In FIG. 2, notations 11A and 13B designate substrates of glass, plastics or the like, 12A, a segment electrode of $In_2O_3$-$SnO_2$ (ITO), $SnO_2$ or the like provided on the surface of the substrate, 12B, a common electrode of a similar construction, 13, a sealing member for sealing the surrounding of the substrates, 14, a liquid crystal and solidified matrix composite wherein nematic liquid crystal is dispersed and held in the solidified matrix, and 1 and 2, overlapped portions of a segment electrode and a common electrode. Further, notation d designates a gap between electrodes, $W_1$, a narrower width of the overlapped portion, and $W_2$, a narrower distance between contiguous overlapped portions.

Further, in FIG. 2, the liquid crystal particles dispersed in the liquid crystal and solidified matrix compound 14 are shown in a completely independent spherical capsule form. However, as mentioned later, the solidified matrix may be of a porous form, the respective particles may be communicated with each other, and the section of particle may be in an elliptic form.

Figure 3:
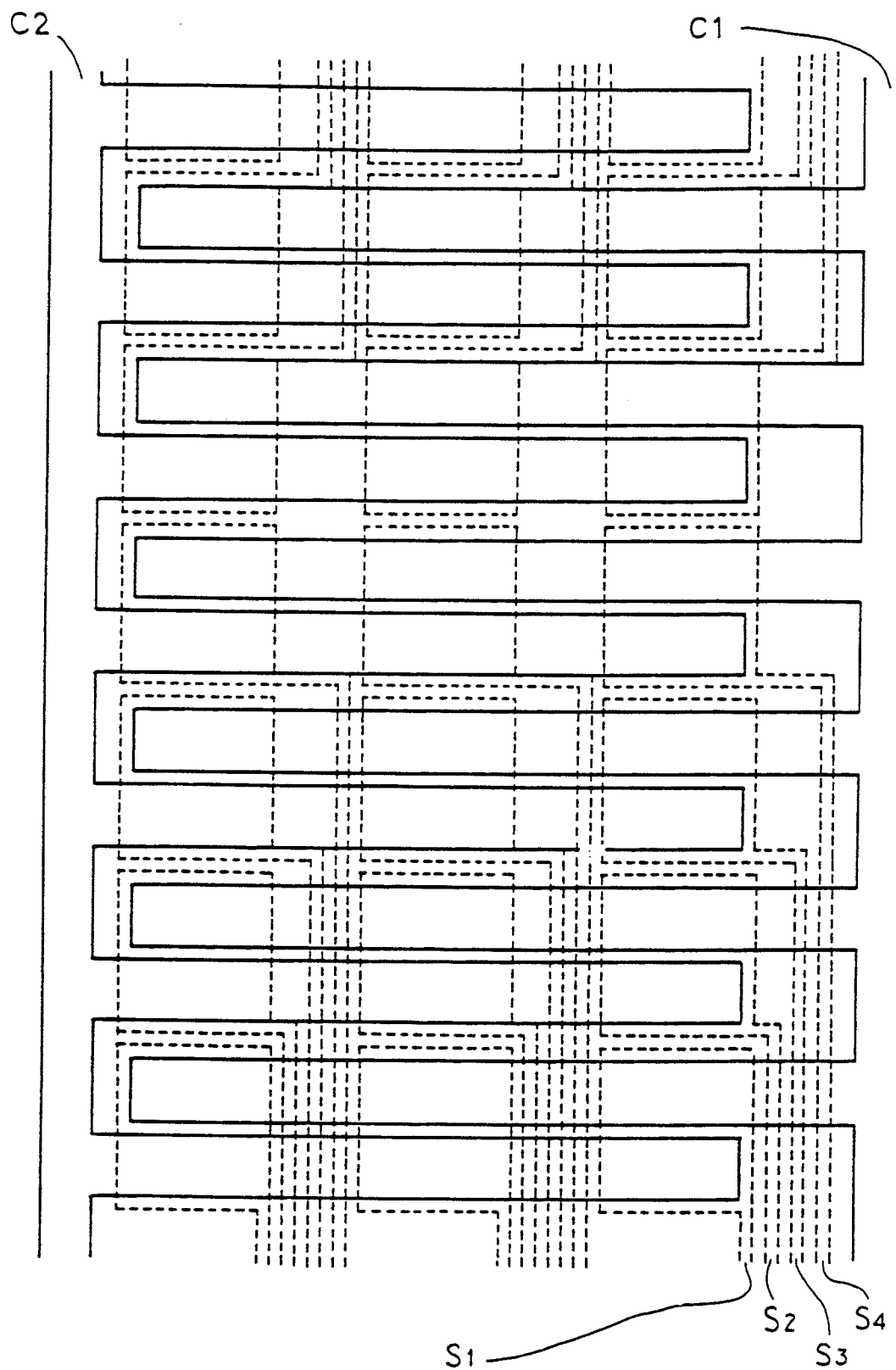
FIG. 3 is a plane view showing an arrangement construction of electrodes of a liquid crystal optical element according to the present invention.

FIG. 3 is a plane view showing a wider portion of the electrode pattern of FIG. 1. As in FIG. 1, also in FIG. 3, the common electrodes are shown by bold lines and the segment electrodes opposing the common electrodes are shown by dotted lines. This is an example of $\frac{1}{4}$ duty, and two common electrodes $C_1$ and $C_2$ and four segment electrodes $S_1$ through $S_4$ arranged in the vertical direction are shown. Actually, a number of sets (three sets in FIG. 3) of the segment electrode groups $S_1$ through $S_4$ are arranged in the horizontal direction in alignment with each other. Further, the number of segment electrodes is not 4, but 8 or 16, and, for instance, pixels of 32×32 dots are formed.

In order to show a high ON/OFF contrast ratio in the near infrared ray wavelength region, for instance, at the wavelength of the YAG laser (about 1.064 μm wavelength) by employing the liquid crystal and solidified matrix composite, a considerably thick gap between electrodes is necessary compared with that in the conventional TN type liquid crystal optical element or the like, which is generally approximately 15 through 35 μm.

In this case, it is necessary to consider a region having a width larger than the width $W_1$(μm) of an actual overlapped portion in consideration of the diffusion of electric fields. The width of the wider region is approximately $W_1+d$(μm). Therefore, it is necessary to satisfy the following relationship, in reference to the reduction projection factor N (wherein the beam is reduced by 1/N) when the information (image or characters) formed on the liquid crystal optical element is projected and forms an image on an object.

$$W_1+d<10\times N \tag{11}$$

In this way, the noises of the projected image caused by the overlapped portions are removed. When the resolution of an optical system employed for an actual projection is less than this order, the condition is further alleviated. Attention is required for providing these overlapped portions that there is a distance between contiguous overlapped portions. When a plurality of overlapped portions are present, and when the distance is too narrow, it is possible that these regions substantially operate in combination due to the distortion of electric field. Therefore, it is necessary that the minimum distance $W_2$(μm) between the contiguous overlapped portions satisfies the following relationship with respect to the gap d(μm) between electrodes of the liquid crystal optical element.

$$W_{12}<d/4 \tag{10}$$

In this way, there are portions between the contiguous overlapped portions wherein light is apparently scattered with certainty, that is, the laser beam is shielded. Therefore, the noises are removed in the reduction projection. The liquid crystal is provided with a particle diameter of μm order, in the liquid crystal and solidified matrix composite for controlling the transmitting and the scattering in the near infrared wavelength region.

Specifically, in case of the wavelength of a YAG laser beam, normally, the liquid crystal is provided with the liquid crystal particle diameter of 2 through 5 μm. Therefore, an information having the liquid crystal particle diameter of this order or less can not be resolved. This amounts to an advantage in this case.

Further, in an optimized scattering state, a scattering cross sectional area of a single liquid crystal particle is several times as much as the section of the liquid crystal particle. Therefore, the effect of scattering light reach the surrounding of the particle which functions to restrain the leak of light therefrom, in case wherein a contiguous overlapped portion is in a transparent state (switching-on state). In this way, the leak of light from the overlapped portion is reduced.

As stated above, a high density writing which has not been performed in the conventional example is achieved by combining the characteristic of the liquid crystal optical element including the liquid crystal and solidified matrix composite and the reduction projecting of an image by a laser beam. The ON/OFF contrast ratio with respect to the near infrared ray laser beam in the liquid crystal and the solidified matrix composite, is higher than that of the conventional TN type liquid crystal optical element, and the light coefficient of utilization (a quantity of transmitting light in transmission) is twice as much as that of the conventional example. Accordingly, the high density writing is made possible and the extremely high function can be achieved.

The liquid crystal optical element of this invention interposes the liquid crystal and solidified matrix composite composed of the solidified matrix formed with a great number of fine pores and the nematic liquid crystal which are filled in the hole portions, between a pair of substrates having electrodes. When a voltage is not applied between these electrodes, the refractive index of the solidified matrix and the refractive index of the liquid crystal disagree with each other and the liquid crystal optical element is in a scattering state. Conversely, when a voltage is applied therebetween which is sufficiently higher than the threshold value voltage, the refractive index of the solidified matrix and the refractive index of liquid crystal agree with each other and the liquid crystal optical element is in a transparent state.

Further, the refractive index of the solidified matrix when the solidified matrix is swelled by the liquid crystals, indicates a refractive index in its swollen state.

The liquid crystal and the solidified matrix composite composed of the solidified matrix formed with a great number of fine pores and the liquid crystal which are filled into the hole portions, is in a structure wherein the liquid crystal is enclosed in vacuoles like microcapsules. The individual microcapsules may be completely independent with each other, or the vacuoles of the individual liquid crystals may be communicated with each other through fine clearances as in a porous body.

The liquid crystal optical element of this invention is provided with a structure wherein the nematic liquid crystal is dispersed and held in the solidified matrix. This liquid crystal optical element may be produced by impregnating the nematic liquid crystal in the perforated solidified matrix. However, in view of the productivity, the uniformity, the scattering property and the like, the liquid crystal optical element is preferably produced by a method wherein a mixture of the nematic liquid crystal and a curable compound is employed as a raw material and the nematic liquid crystal is separated in curing of the curable compound.

Specifically, a method is preferable wherein a uniform solution of the nematic liquid crystal and the curable compound is employed, and in curing the curable compound, a phase separation is caused whereby the liquid crystal and solidified matrix composite is formed in which the nematic liquid crystal is dispersed in the curable matrix. According to this method, a uniform liquid crystal and solidified matrix composite can be produced with good productivity. Further, the curing for forming the solidified matrix as stated above includes the curing in polymerizing monomers or oligomers, the curing by bridging and the solidification by cooling from a molten state by heating.

Further, also a method is possible wherein an emulsion of the nematic liquid crystal and a curable compound is formed, the nematic liquid crystals and the curable compound are previously separated in a fine dispersion state, and the curable compound is cured thereby fixing the dispersion.

Especially, a method of making the liquid crystal optical element by the phase separation from a uniform solution of the nematic liquid crystal and the curable compound, is preferable in this invention. It is preferable in view of the productivity to employ a photo-curable compound as the curable compound. The productivity is improved since the compound can be cured in a closed system and a system of injecting the compound into a cell can be utilized as in the conventional TN type liquid crystal display element, since the removal of solvent is not necessary. Further, the curing step can be shortened and the controlling of the liquid crystal particle diameter is facilitated since the compound can be cured by light irradiation, which is preferable.

In this case, it is preferable to use a photo-curable vinyl species compound. Specifically, a photo-curable acrylic species compound is exemplified and particularly, a compound which includes acrylic oligomers which are polymerized and cured by light irradiation is preferable.

The nematic liquid crystal employed in this invention is a liquid crystal wherein the refractive index of the solidified matrix agrees with the refractive index of the liquid crystal either in application of voltage or in non-application of voltage, which may be employed in a single compound or in a composition. However, the composition has an advantage to satisfy various required functions such as an operational temperature range and an operational voltage. Especially, a liquid crystal is preferably employed which is provided with the positive dielectric anisotropy and the refractive index of the solidified matrix agrees with the ordinary light refractive index $n_O$ of the liquid crystal.

In case of the liquid crystal employed in the liquid crystal and solidified matrix composite, when the photo-curable compound is employed, it is preferable that the photo-curable compound is uniformly dissolved, the cured substance after light exposure is insoluble or is difficult to dissolve. When the compound is employed, it is preferable that the solubilities of the individual liquid crystals are as similar as possible.

In making the liquid crystal and solidified matrix composite, as in the conventional normal liquid crystal optical element, a couple of substrates having electrodes are disposed such that the electrode faces oppose each other, the surroundings are sealed by a sealing member, a mixture solution for an uncured liquid crystal and solidified matrix composite is injected through an injection port, and the injection port is sealed. Or, an uncured mixture of a curable compound and liquid crystal is supplied on one substrate and the other substrate is laminated on the assembly such that the electrode faces oppose each other.

The liquid crystal and solidified matrix composite of this invention may be added with a dichroic dye or a mere colorant, or a pigment in the liquid crystal, or a colored curable compound may be employed. Other than those, a viscosity adjusting agent, spacers for controlling the gap between electrodes, or an additive agent of non-liquid crystal or the like may be added thereto.

In this invention, it is not necessary to evaporate a mere solvent or water which becomes unnecessary in curing, by employing the liquid crystal in the liquid crystal and solidified matrix composite as a solvent and by curing the photo-curable compound by light exposure. Accordingly, the conventional method for making by injection to a cell can be adopted as it is since the compound is cured in a closed system, which is provided with a high reliability, and the reliability is promoted further since the photo-curable compound is provided with an effect of adhering two sheets of substrates.

The liquid crystal optical element can be made with extremely good productivity by forming the liquid crystal and solidified matrix composite, wherein a danger of shortcircuiting the upper and lower transference electrodes, is low and the transparent state and the scattering state can be controlled without strictly controlling the orientation and the gap between electrodes as in the normal TN type display element.

The laser beam source in the projection apparatus may be a laser beam source capable of generating the near infrared ray laser beam, a representative example of which is a YAG laser. The supply means may be the one wherein the laser beam emitted from the laser beam source can be supplied to the liquid crystal optical element, which is generally the one wherein the light flux of the laser beam is expanded by a lens or the like or the scanning is performed by utilizing the rotation of a mirror. However, the supply means may be the one wherein the progressing direction of light is continuously changed by an acoustic-optical element, an electro-optical element or the like.

It is of a great value that the YAG laser beam having high energy density can be controlled with low loss and high accuracy.

As the other near infrared laser, a semiconductor laser having approximately 0.8 μm of wavelength may be pointed out. As in the YAG laser, with respect to the control of the semiconductor laser, the liquid crystal optical element of this invention can perform the display control of small light loss and high contrast by the liquid crystal and solidified matrix composite which operates as a function layer. Specifically, the shape and structure of capsules forming the liquid crystal and solidified matrix composite and physical values of employed liquid crystal may be adapted to the wavelength of the semiconductor laser. For instance, $\Delta n \cdot R$ is approximately equal to or a little smaller than that in the YAG laser.

The projection optical system may be the one which is composed of ordinary lenses and wherein the image of the liquid crystal optical element is reduction-projected on the object. Naturally, the system may employ lenses, a plane mirror or a concave mirror. Especially, the contrast ratio may be promoted by providing an apparatus for reducing a diffusion light on an optical path between the liquid crystal optical element and the projected body as in the aforementioned aperture or spot.

The apparatus for reducing the diffusion light may be the one which takes out the straightly progressing light with respect to the incident light (light passing through a transparent state portion of a pixel portion) among the light which has passed through the liquid crystal optical element and which reduces the light which does not straightly progress (light scattered by the scattered state portion of the liquid crystal and solidified matrix composite). Especially, it is preferable that the apparatus reduces the diffusing light which is the light that does not straightly progress, without reducing the straightly progressing light.

As a specific apparatus, an aperture or a spot which is a perforated plate is disposed in the vicinity of a focus position between the liquid crystal optical element and the object. Thereby, the light which straightly progresses with respect to the incident light, among the light which has been emitted from the laser beam source and has passed through the liquid crystal optical element, is condensed, passes through the hole perforated in the aperture or the spot in the vicinity of the focus, and is projected to the object. On the other hand, the light of beam which has been scattered by the liquid crystal optical element and which does not straightly progress, does not pass through the hole perforated at the aperture or the spot in the vicinity of the focus even if it is condensed. Accordingly, the scattering light is not projected and the contrast ratio is promoted.

Further, in other instances, i t is possible that a mirror having a small area is obliquely disposed at a position in the vicinity of the focus and the light is reflected and projected. The focal length and the aperture of lens for projection may be selected such that the scattered light is removed, without using a special aperture or the like.

Further, when the laser beam is scattered, the beam receives a random phase modulation. Therefore, the coherency of the incident laser beam is considerably deteriorated and the intensity of the laser beam is attenuated. Accordingly, when the laser beam having the high coherency is employed as an incident beam, the attenuation by scattering is magnified compared with the case wherein the randomly modulated beam is employed as the incident beam.

Therefore, it is possible that a contrast ratio which has practically no problem is provided without using the apparatus for reducing the diffusing light. In this case, it is possible that the apparatus for reducing the diffusing light is not employed. Naturally, the high contrast ratio can be provided by employing the apparatus for reducing the diffusion light even in this case.

In the liquid crystal optical element of this invention, since the refractive index anisotropy $\Delta n$ of employed liquid crystal, the viscosity, the mean particle diameter R of the liquid crystal which is dispersed and held in the solidified matrix, and the gap d between electrodes are in a specified range, a high transmitting and scattering functions are achieved in controlling the near infrared ray laser beam and an excellent multiplexed driving characteristic is shown.

Further, in the laser projection apparatus of this invention, the narrower width $W_1$ of the overlapped portion of the both electrodes and the gap d between electrodes satisfies the following relationship.

$$W_1 + d < 10 \times N \tag{11}$$

In this way, the leak of light can be restrained at portions other than the pixels when controlling the laser beam in the near infrared wavelength region, compared with the conventional TN type liquid crystal optical element and the like, by employing the liquid crystal and solidified matrix composite which necessitates a considerably thick gap between electrodes.

In this invention, the liquid crystal and solidified matrix composite is generally provided with the gap between electrodes which is approximately as thick as 15 through 35 μm. Therefore, the expanding of electric field is generated. Therefore, the alignment of the liquid crystal is performed in a range which is a little wider than the portion interposed by the electrodes. Accordingly, it is necessary to regard the length of the portion causing the transmission of light as $W_1 + d$ as in the above relationship (11). The transmission of light is also arisen at the spacer material for constantly keeping the gap between substrates. However, the narrower width of the spacer material is normally equal to d. Accordingly, the leakage of light by the spacers can be restrained by satisfying the above relationship (11), since naturally equation (6): $d < 10 \times N$.

Further, when a plurality of overlapped portions are present, and when the distances among the plurality of overlapped portions are too narrow, it is possible that these regions substantially operate in combination, by the diffusion of electric field and the like. Accordingly, the relationship between the minimum distance $W_2$ between the contiguous overlapped portions and the gap d between electrodes should satisfy the following relationship (12).

$$W_2 < d/4 \tag{12}$$

Therefore, a portion is present between the contiguous overlapped portions which can be in a transparent state, which is apparently a scattering portion with certainly, that is, the portion which shields the laser beam. Generally, in case of controlling the near infrared ray region laser beam, the liquid crystal and solidified matrix composite is normally provided with the liquid crystal particle size of 2 through 5 $\mu m$. In the liquid crystal and solidified matrix composite, the information which is equal to or smaller than the liquid crystal particle diameter is not resolved since light is scattered on the interface between the liquid crystal particle and solidified matrix, which satisfy the equation (12), and the leak of light is restrained in performing the reduction projection.

EXAMPLE

Example 1

Nematic liquid crystal, 2 functional urethane acrylate oligomers, acrylate monomers and a photo-initiator were uniformly dissolved, and the solution was injected into a cell composed of glass substrates having dot-patterned ITO electrodes with a gap between electrodes of .24 $\mu m$, which was polymerized and cured by ultraviolet ray irradiation, thereby forming a liquid crystal optical element wherein a liquid crystal and solidified matrix composite was interposed between the couple of substrates having electrodes. Further, glass beads having a diameter of approximately 24 $\mu m$ were mixed as spacers.

The mean particle diameter of the liquid crystal in the solidified matrix was approximately 3.5 $\mu m$. Further, with respect to the physical property of employed liquid crystal, the refractive index anisotropy $\Delta n$ in the visible light was 0.21, the dielectric constant anisotropy $\Delta \epsilon$ was 10.9 and the viscosity was approximately 50 cSt, at room temperature.

With respect to the characteristic at the wavelength of 1.064 $\mu m$ of the YAG laser, the transmittance in switching-off was 0.3%, the transmittance in switching-on was 75% at 6 V and the ON/OFF contrast ratio was approximately 250. With respect to the characteristic when the element undergoes the multiplexed driving, the transmittance in switching-on was 75%, the contrast ratio was approximately 100 at ½ duty, the transmittance in switching-on was 68% and the contrast ratio was approximately 40 at ¼ duty, showing an excellent multiplexed driving characteristic.

Further, this element has little hysteresis characteristic in the voltage-transmittance characteristic. The changes of the transmittance and the contrast were not observed when rewriting is performed without employing an erase signal. Further, the response time from the switching-on state to the switching-off state was approximately 70 msec.

Next, a YAG laser marker was constructed by employing the liquid crystal optical element as a mask, the projection was performed at the reduction projection ratio of 10 (magnification of 1/10) and an image was marked on a plastic substrate. The written image was provided with a high uniformity. Almost no influence of spacers was observed at this reduction projection ratio. Further, when the reduction projection ratio was changed to 2 (magnification of ½), the nonuniformity due to the presence of the spacers was partially caused.

Example 2

A liquid crystal optical element was formed which includes a liquid crystal and solidified matrix composite approximately as in Example 1. Different from Example 1, the employed liquid crystal was provided with the refractive index anisotropy $\Delta n$ of 0.27, the dielectric constant anisotropy of $\Delta \epsilon$ of 16.9 and the viscosity of approximately 54 cSt. Further, the mean diameter of the liquid crystal particles was approximately 2.8 $\mu m$ and the gap between electrodes was 20 $\mu m$.

With respect to the characteristic by the YAG laser, the transmittance in switching-off was 0.35%, the transmittance in switching-on, 64% at 10 V, and the ON/OFF contrast ratio was approximately 200. With respect to the characteristic in driving the element by multiplexed driving, the transmittance in switching-on was 60%, the contrast ratio was approximately 60 at ½ duty, the transmittance in switching-on was 55% and the contrast ratio was approximately 30 at ¼ duty, showing an excellent multiplexed driving characteristic.

Further, since a hysteresis characteristic is observed in the voltage-transmittance characteristic of this element, the rewriting was performed by employing an erase signal which controls the voltage at 0 V for the total surface in rewriting the image. Then, no changes of the transmittance and the contrast were observed. Further, the response time from the switching-on state to the switching-off state was approximately 60 msec.

Next, a YAG laser marker was constructed by employing the element as a mask, the projection was performed at the reduction projection ratio of 10 (magnification of 1/10), and an image was marked on a plastic substrate. The written image was provided with high uniformity. Almost no influence of spacers was observed at the reduction projection ratio.

Example 3

A liquid crystal optical element was formed approximately as in Example 1. However, the condition in ultraviolet ray irradiation was changed so that the shape of the dispersed liquid crystal particle was deformed. The aspect ratio was about 1.6. The characteristic of the element was approximately the same as that in Example 1. However, the response time from the switching-on state to the switching-off state was approximately 30 msec.

Example 4

A liquid crystal optical element was formed approximately as in Example 1. However, the condition in ultraviolet ray irradiation was changed and the shape of the dispersed liquid crystal particle was deformed. The shape of the liquid crystal particle was an ellipsoid approximately similar to a sphere wherein the aspect ratio was about 1.3, the particle diameter distribution of these was small, and the liquid crystal particles were present densely in the solidified matrix.

The particle density was approximately $2.7 \times 10^7$ piece/mm$^3$, and the density D was approximately 2.9 pieces/unit with respect to the optical unit volume V=108 μm$^3$.

The operational characteristic of this element was provided with a result which is approximately the same with that in Example 1. However, the response time from the switching-on state to the switching-off state was approximately 50 msec.

Figure 6:
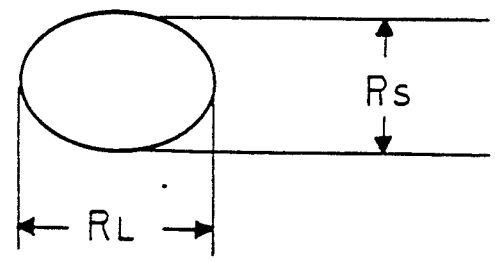
FIG. 6 is a front view of a liquid crystal particle having an ellipsoidal shape.
Figure 7:
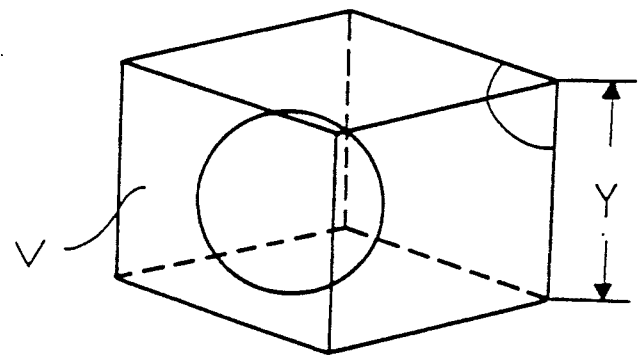
FIG. 7 is a perspective view showing liquid crystal particles having approximately spherical shape which are incorporated in an optical unit volume V.
Figure 8:
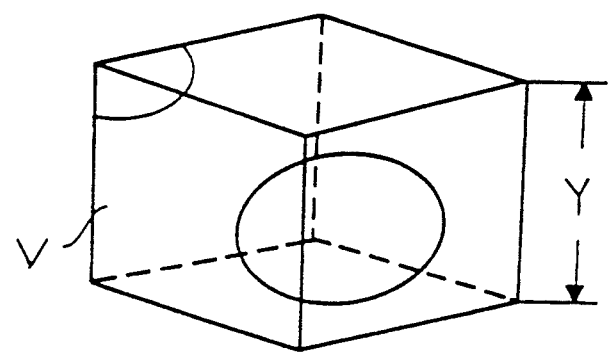
FIG. 8 is a perspective view showing liquid crystal particles having an ellipsoidal shape which are incorporated in an optical unit volume V.

FIG. 6 shows a liquid crystal particle having an ellipsoidal shape. FIGS. 7 and 8 schematically show liquid crystal particles which are incorporated in the optical unit volume V.

Example 5

A liquid crystal optical element was formed approximately as in Example 2. However, the curing condition in ultraviolet ray irradiation was changed and the shape of the dispersed liquid crystal particle was deformed. The shape was ellipsoidal wherein the aspect ratio was approximately 1.4, the particle diameter distribution of these was small and the particles were present densely in the solidified matrix.

The particle density was approximately $5.1 \times 10^7$ pieces/mm$^3$, and the density D was approximately 2.6 pieces/unit with respect to the optical unit volume of V=51 μm$^3$.

The operational characteristic of this element was provided with a result which is approximately the same with that in Example 1. However, the response time from the switching-on state to the switching-off state was approximately 40 msec.

Figure 9:
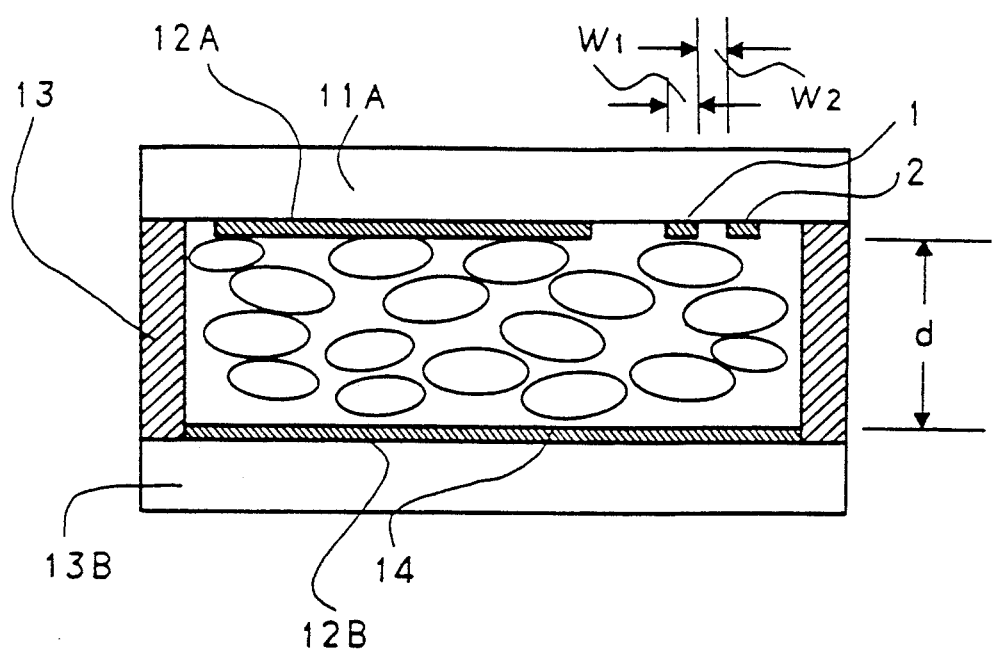
FIG. 9 is a sectional diagram of a basic construction (third example) of a liquid crystal optical element according to the present invention.

FIG. 9 shows a sectional diagram of a liquid crystal optical element provided with a liquid crystal and solidified matrix composite composed of liquid crystal particles having an ellipsoidal shape.

Comparative Example 1

A liquid crystal optical element was formed approximately as in Example 1. However, a quantity of the starting agent and the condition of ultraviolet ray irradiation were changed and the mean particle diameter was approximately 1.8 μm.

This element showed a sufficient scattering property with respect to the visible light. However, in the wavelength of the YAG laser, the scattering property was weak, the transmittance in switching-off was 7%, the transmittance in switching-on was 74% at 10 V and the ON/OFF contrast ratio was approximately 10. When the element was driven by the multiplexed driving, the contrast ratio at ½ duty was 6 at maximum.

Example 6

Nematic liquid crystal, 2 functional urethane acrylate oligomers, acrylate monomers and an optical reaction starting agent were uniformly dissolved, which was injected to a cell composed of glass substrates having dot-patterned ITO electrodes with a gap between electrodes of 20 μm, and the solution was polymerized and cured by the ultraviolet ray irradiation, thereby forming a liquid crystal optical element wherein a liquid crystal and solidified matrix composite element was interposed between the couple of substrates having electrodes. Further, glass beads having a diameter of approximately 20 μm were mixed as spacers.

The mean particle diameter of the liquid crystals in the solidified matrix was approximately 3.5 μm. Further, with respect to the physical property of employed liquid crystal, the refractive index anisotropy Δn was 0.21, the dielectric constant anisotropy Δε, 10.9, and the viscosity, approximately 50 cSt.

Figure 10:
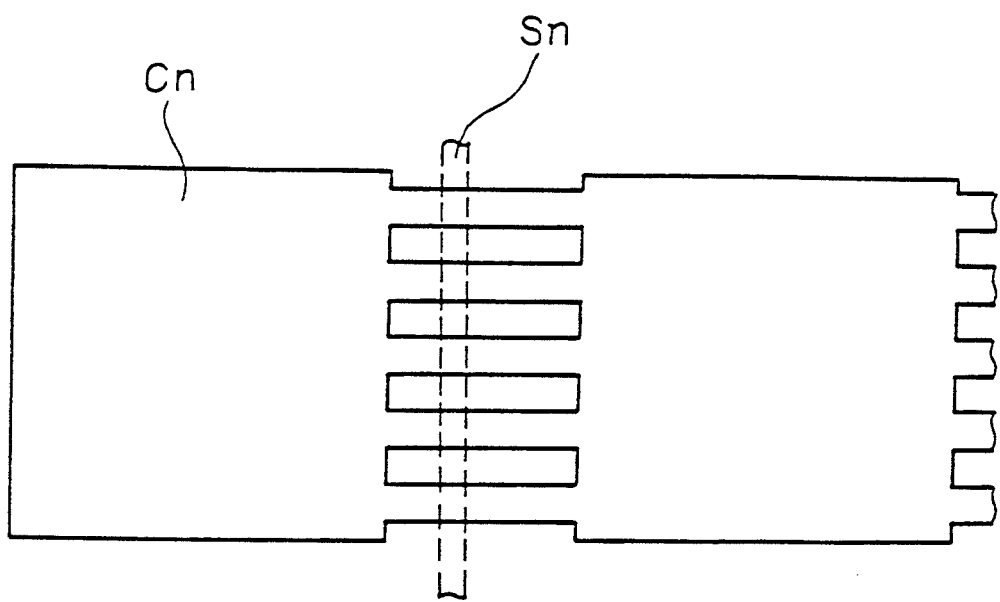
FIG. 10 is a plane view showing an arrangement construction of electrodes (common electrode is provided with five narrowed and separated lead parts) of liquid crystal optical element according to the present invention.

The construction of pixels of this element was 60 × 30 (number of pixels=1800), two pixels were integrated into one segment electrode (number of segment electrodes=900), and two common electrodes were provided. Segment electrodes were led out both in the upper direction and in the lower direction as in FIG. 3, the width of lead lines of the segment electrode was 20 μm, the distance between contiguous lines was 10 μm, and the lines were led out in the upper and lower directions of the element along the respective pixel columns. The common electrodes were arranged in a comb-like form at every single column of pixel. Although the space between contiguous elements of the common electrodes is shown by the same width with that of the common electrode in FIG. 3, in this example, the contiguous pixels of the common electrode were connected by five lead lines of 40 μm. FIG. 10 shows narrowed and separated five lead portions of this example.

This patterning shows that the 2 mm×2 mm square portions function as essential pixel areas to switch light ON/OFF, and those five lead portions of 40 μm width connect the square portions.

In this construction, the overlapped portion is provided with a rectangular shape of length 40 μm x width 20 μm, surrounded by the lines between the contiguous pixels of the common electrode (width 40 μm) and the lines between the segment electrode (width 20 μm). Therefore, the narrower width 20 μm was $W_1$. Further, the distance $W_2$ between the contiguous overlapped portions was 10 μm.

The aperture ratio (an area occupied by a pixel/an area of an element including a region between pixels) was approximately 90%. With respect to the characteristic at the wavelength of 1.064 μm of the YAG laser, the transmittance in switching-off was 0.3%, the transmittance in switching-on was 60% at 7 V and the ON/OFF contrast ratio was approximately 200. With respect to the characteristic in driving the element by the multiplexed driving, the transmittance in switching-on was 60%, and the contrast ratio was approximately 100 at ½ duty, showing an excellent multiplex driving characteristic.

Next a YAG laser marker was constructed by employing the element as a mask, the projection was performed at the reduction projection ratio of 10 (magnification of 1/10) and the image was marked on a plastic substrate. The written image was provided with a high uniformity and the influence of leak of light at the overlapped portions of electrodes was not observed at all.

Further, the size of the pixel in this pattern was 2 mm square and the aperture ratio (an area occupied by a pixel/a unit area of a liquid crystal element including a region between pixels) of this pattern was approximately 90%. The overlapping of lines of common electrode of a pixel and lines of segment electrode of another pixel, was approximately 0.7% with respect to a pixel.

In the overlapped portion in case of the above construction, an area of an overlapped portion in a single pixel was 0.028 mm², since a single line having width of 40 μm of a common electrode intersects with seven segment electrodes having the line width of 20 μm at maximum.

The area was 4 mm² in the total of the pixel elements and the ratio was 0.7%.

With respect to the characteristic at the wavelength of approximately 1.064 μm of the YAG laser beam, the transmittance in switching-off was 0.3%, the transmittance in switching-on was 65% at 7 V, and the ON/-OFF contrast ratio was approximately 200.

With respect to the characteristic in driving the liquid crystal optical element by the multiplexed driving, the transmittance in switching-on in driving was approximately 60%, and the contrast ratio was approximately 100 at ½ duty, showing an excellent multiplexed driving characteristic.

Comparative Example 2

A liquid crystal optical element was formed approximately as in Example 6. Further, the ITO electrode pattern was changed from that in Example 1 and lines were provided among pixels such that no overlapping of electrodes was caused for the static driving.

The construction of the pixel was 20×20 (number of pixels=400), a single pixel was provided for a single segment electrode (number of segment electrodes=400) for the static driving, and a single common electrode was provided. The width of lines of the segment electrode was 20 μm and the distance between the contiguous segment electrodes was 10 μm.

The aperture ratio of this pattern was approximately 87%, which is low compared with that in Example 4, although the number of pixels were far less than that in Example 4. A YAG laser marker was constructed by employing this element, the projection was performed by the reduction projection ratio of 10 (magnification of 1/10) and an image was marked on a plastic substrate. The written image was provided with a considerably deteriorated resolution, since the number of pixels was very small compared with that in Example 4.

In the invented liquid crystal element, the liquid crystal and solidified matrix composite composed of the specified nematic liquid crystal and the solidified matrix is interposed between the substrates having electrodes. Therefore, the near infrared ray laser beam can efficiently be controlled with little transmission loss. Accordingly, the working or the marking of a projected object can easily be performed by employing the laser projection apparatus.

Further, the multiplexed driving characteristic is improved and the multiplexed driving of ½ duty, ¼ duty and the like can be performed, while maintaining a high contrast ratio, in use of the liquid crystal optical element employing the liquid crystal and solidified matrix composite, which has been difficult to perform in the conventional multiplexed driving. Therefore, for instance, in case of a 36×36 dots matrix, the number of pixels is 1296, and 1297 terminals have been required in the conventional static driving. By contrast, this invention provides an advantage wherein the number of terminals can be reduced to 650 at ½ duty and 328 at ¼ duty.

Various applications are possible in this invention in the range wherein the effect of this invention is not deteriorated.

What is claimed is:

1. A liquid crystal optical element of a transparent and scattering type for controlling a laser beam having approximately 1 μm of wavelength interposing a liquid crystal and solidified matrix composite in which nematic liquid crystal is dispersed and held in a solidified matrix between substrates having electrodes at least one of which is transparent, wherein the refractive index anisotropy $\Delta n$ of the nematic liquid crystal is 0.18 or higher;

the viscosity $\eta$(cSt) thereof is equal to or less than 60;

a mean particle diameter $R(\mu m)$ of the nematic liquid crystal dispersed and held in the solidified matrix and a gap $d(\mu m)$ between the electrodes satisfy relationships of $$0.5 < \Delta n \cdot R < 1.3,$$

$$3.5 < \Delta n \cdot d < 8.0; \text{ and}$$

the refractive index anisotropy $\Delta n$ of the liquid crystal, the mean particle diameter $R(82\ m)$ of the nematic liquid crystal dispersed and held in the solidified matrix and a number $D_1$ of liquid crystal per optical unit volume satisfy a relationship of $$0.8(R \cdot \Delta n)^{-3} < D_1 < 1.4(R \cdot \Delta n)^{-3}.$$

2. The liquid crystal optical element according to claim 1, wherein the liquid crystal and solidified matrix composite is provided by photo-curing a uniform solution of the nematic liquid crystal and a photo-curable compound.

3. The liquid crystal optical element according to claim 1, wherein the refractive index anisotropy $\Delta n$ of the liquid crystal satisfies a relationship of $$0.20 < \Delta n < 0.29.$$

4. The liquid crystal optical element according to claim 1, wherein the refractive index anisotropy $\Delta n$ of the liquid crystal satisfies a first relationship of $$0.20 < \Delta n < 0.29,$$

and the dielectric constant anisotropy $\Delta \epsilon$ of the liquid crystal satisfies a second relationship of $$5 < \Delta \epsilon < 14.$$

5. The liquid crystal optical element according to any one of claims 1–4, further comprising:

a driving means for driving the liquid crystal optical element;

a laser beam source;

a supply means for supplying a laser beam emitted from the laser beam source to the liquid crystal optical element; and a projection optical system for reduction projecting the laser beam from the liquid crystal optical element onto an object, wherein for a reduction projection factor N the image formed on the liquid crystal optical element is projected by 1/N and the gap $d(\mu m)$ between electrodes satisfies a relationship of $$d < 10 \times N.$$

6. The liquid crystal optical element according to any one of claims 1–4, further comprising:

a driving means for driving the liquid crystal optical element;

a laser beam source;

a supply means for supplying a laser beam emitted from the laser beam source to the liquid crystal optical element; and a projecting optical system for reduction-projecting the laser beam emitted from the liquid crystal optical element onto an object to be projected;

wherein said driving means for driving the liquid crystal element employs a multiplexed driving.

7. A liquid crystal optical element of a transparent and scattering type for controlling a laser beam having approximately 1 μm of wavelength of interposing a liquid crystal and solidified matrix composite in which nematic liquid crystal is dispersed and held in a solidified matrix between substrate having electrodes at least one of which is transparent, wherein the refractive index anisotropy Δn of the nematic liquid crystal is 0.18 or higher;

the viscosity η(cSt) thereof is equal to or less than 60;

the nematic liquid crystal dispersed and held in the solidified matrix is provided with approximately an ellipsoid form;

a ratio of a first mean diameter $R_L$ in a long axis of said ellipsoid as compared with a second mean diameter $R_S$ in a short axis thereof, or an aspect ratio, $L = R_L/R_S$, is determined as $$1.3 \leq L \leq 2.5,$$

a gap d(μm) between electrodes is determined as $$3.5 < \Delta n \cdot d < 8.0; \text{ and}$$

the refractive index anisotropy Δn of the liquid crystal the means particle diameter R(μm) of the nematic liquid crystal dispersed and held in the solidified matrix and a number $D_1$ of liquid crystal per optical unit volume satisfy a relationship of $$0.8(R \cdot \Delta n)^{-3} < D_1 < 1.4(R \cdot \Delta n)^{-3}.$$

8. A liquid crystal optical element of a transparent and scattering type for controlling a laser beam having approximately 1 μm of wavelength interposing a liquid crystal and solidified matrix composite in which nematic liquid crystal is dispersed and held in a solidified matrix between substrates having electrodes at least one of which is transparent, wherein the refractive index anisotropy Δn of the nematic liquid crystal is 0.18 or higher;

the viscosity η(cSt) thereof is equal to or less than 60;

the nematic liquid crystal dispersed and held in the solidified matrix is provided with approximately an ellipsoid form;

a ratio of a first means diameter $R_L$ in a long axis of said ellipsoid as compared with a second mean diameter $R_S$ in a short axis thereof, or an aspect ratio, $L = R_L/R_S$, is determined as $$1.3 \text{'} L \leq 2.5,$$

the mean diameter value $R_M$ of $R_L$ and $R_S$ is defined as $$R_M = (R_L + R_S)/2,$$

the refractive index anisotropy Δn and said mean diameter value $R_M$ satisfy a first relationship of $$0.5 < \Delta n \cdot R_M < 1.3,$$

the refractive index Δn and a gap d(μm) between electrodes satisfy a second relationship of $$3.5 < \Delta n \cdot d < 8.0; \text{ and}$$

wherein a number $D_2$ of liquid crystal per optical unit volume satisfy a relationship of $$0.8(R_M \cdot \Delta n)^{-3} < D_2 < 1.4(R_M \cdot \Delta n)^{-3}.$$

9. The liquid crystal optical element according to any one of claims 1, 7 or 8, wherein the laser beam is a YAG laser beam.

10. The liquid crystal optical element according to any one of claims 1, 7 or 8, wherein the laser beam is a semiconductor laser beam.

11. The liquid crystal optical element according to any one of claims 1, 7 or 8, wherein the laser beam is selected from the group consisting of a solid state laser, a wavelength variable laser or a wavelength converted laser.

12. The liquid crystal optical element according to any one of claims 1, 7 or 8, wherein the wavelength of the laser beam is in a range from 0.8 to 1.2 μm.

13. The liquid crystal optical element according to any one of claims 1, 7, or 8, wherein the wavelength of the laser beam is in a range from 0.9 to 1.1 μm.

14. The liquid crystal optical element according to either one of claims 7 or 8, wherein the liquid crystal and solidified matrix composite is provided by photo-curing a uniform solution of the nematic liquid crystal and a photo-curable compound.

15. The liquid crystal optical element according to either one of claims 7 or 8, wherein the refractive index anisotropy Δn of the liquid crystal satisfies a relationship of $$0.20 < \Delta n < 0.29.$$

16. The liquid crystal optical element according to either one of claim 7 or 8, wherein the refractive index anisotropy Δn of the liquid crystal satisfies a first relationship of $$0.20 \Delta n < 0.29,$$

and the dielectric constant anisotropy Δε of the liquid crystal satisfies a second relationship of $$5 < \Delta \epsilon < 14.$$

17. The liquid crystal optical element according to either one of claims 7 or 8, wherein both $R_L$ and $R_S$ are in a range of 3 through 5 (μm).

18. The liquid crystal optical element according to either one of claims 7 or 8, further comprising:

a driving means for driving the liquid crystal optical element;

a laser beam source;

a supply means for supplying a laser beam emitted from the laser beam source to the liquid crystal optical element; and a projecting optical system for reduction-projecting the laser beam emitted from the liquid crystal optical element onto an object to be projected, wherein for a reduction projection factor N the image formed on the liquid crystal optical element is projected by 1/N and the gap d(μm) between electrodes satisfy a relationship of $$d < 10 \times N.$$

19. The liquid crystal optical element according to either one of claims 7 or 8, further comprising:
   a driving means for driving the liquid crystal optical element;
   a laser beam source;
   a supply means for supplying a laser beam emitted from the laser beam source to the liquid crystal optical element; and
   a projecting optical system for reduction projecting the laser beam emitted from the liquid crystal optical element onto an object to be projected;
   wherein said driving means for driving the liquid crystal element employs a multiplexed driving.

20. A laser projection apparatus comprising:
   a liquid crystal optical element which includes a liquid crystal and solidified matrix composite in which nematic liquid crystal is dispersed and held in a solidified matrix having a refractive index which is substantially equal to an ordinary refractive index ($n_O$) of the liquid crystal and which is interposed between first and second substrates, wherein the first substrate is provided with at least one segment electrode and the second substrate is provided with at least one common electrode, and wherein at least one of the substrates is transparent;
   a multiplexed driving means for driving the liquid crystal optical element;
   a laser beam source having an output laser beam of approximately 1 μm wavelength;
   a light supply means for transmitting the laser beam to the liquid crystal optical element; and
   a reduction type projection optical system for projecting the laser beam from the liquid crystal optical element onto an object with a reduction projection factor N;
   wherein a lead line connected to the at least one common electrode located on the second substrate is partially overlapped with a lead line connected to the at least one segment electrode located on the first substrate, wherein a width $W_1(\mu m)$ of the overlapped portion, the reduction reduction factor N, and gap length d(μm) between the at least one common electrode and the at least one segment electrode of the liquid crystal optical element, satisfy a relationship of $$W_1 + d < 10 \times N.$$

21. The laser projection apparatus according to claim 20, wherein there are a plurality of at least one of the common electrodes and the segment electrodes, there is a lead line connected to each of the common and segment electrodes, there is a plurality of overlapped portions, and a distance $W_2(\mu m)$ between two of the plurality of overlapped portions satisfies a relationship of $$W_2 d/4.$$

22. The laser projection apparatus according to either one of claims 20 or 21, wherein the refractive index anisotropy Δn of the nematic liquid crystal is 0.18 higher;
   the viscosity η(cSt) thereof is equal to or less than 60; and
   the refractive index anisotropy Δn, a means particle diameter R(μm) and a gap d(μm) between electrodes satisfy relationships of $$0.5 < \Delta n \cdot R < 1.3,$$

$$3.5 < \Delta n \cdot d < 8.0.$$

23. The laser projection apparatus according to either one of claims 20 or 21, wherein the overlapped portion is formed by lead lines crossing at which the lead line of the at least one common electrode to supply select voltage to a just pixel is intersected with the lead line of the at least one segment electrode to supply data voltage to other pixels in the vicinity of the just pixel; and
   a sum value $S_X$ of said overlapped portion area and an effective pixel area $S_P$ of the first pixel satisfy a relationship of $$0.001 \leq S_X/S_P \leq 0.05.$$

* * * * *